United States Patent
Peng et al.

(10) Patent No.: US 12,089,269 B2
(45) Date of Patent: Sep. 10, 2024

(54) RESOURCE REQUEST METHOD, RESOURCE ALLOCATION METHOD, APPARATUS, AND MEDIUM

(71) Applicant: Huawei Technologies Co., Ltd., Shenzhen (CN)

(72) Inventors: Wenjie Peng, Shanghai (CN); Xiao Xiao, Shenzhen (CN); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 17/452,893

(22) Filed: Oct. 29, 2021

(65) Prior Publication Data
US 2022/0046730 A1  Feb. 10, 2022

Related U.S. Application Data

(63) Continuation of application No. PCT/CN2020/087340, filed on Apr. 27, 2020.

(30) Foreign Application Priority Data

Apr. 30, 2019  (CN) .......................... 201910370988.3

(51) Int. Cl.
*H04W 76/11*  (2018.01)
*H04W 4/40*  (2018.01)
(Continued)

(52) U.S. Cl.
CPC .............. *H04W 76/11* (2018.02); *H04W 4/40* (2018.02); *H04W 72/044* (2013.01); *H04W 72/20* (2023.01)

(58) Field of Classification Search
CPC ..... H04W 72/044; H04W 72/20; H04W 4/40; H04W 76/11; H04W 76/15; H04W 92/18; H04W 48/16
See application file for complete search history.

(56) References Cited

U.S. PATENT DOCUMENTS

2015/0271810 A1  9/2015  Sartori et al.
2017/0099658 A1  4/2017  Shattil
(Continued)

FOREIGN PATENT DOCUMENTS

CN  105517168 A  4/2016
CN  106341839 A  1/2017
(Continued)

OTHER PUBLICATIONS

3GPP TS 36.331 V15.5.1 (Apr. 2019), 3rd Generation Partnership Project; Technical Specification Group Radio Access Network; Evolved Universal Terrestrial Radio Access (E-UTRA); Radio Resource Control (RRC); Protocol specification (Release 15), 948 pages.
(Continued)

*Primary Examiner* — Chi Ho A Lee
(74) *Attorney, Agent, or Firm* — Slater Matsil, LLP

(57) ABSTRACT

Embodiments of this application disclose a resource request method, a resource allocation method, an apparatus, and a medium. The resource request method includes: receiving a first frequency information list and a second frequency information list from an access network device; sending resource request information to the access network device, where the resource request information carries destination V2X service indication information, and the destination V2X service indication information corresponds to a first RAT and/or corresponds to a second RAT; receiving resource indication information from the access network device, where the resource indication information is a time-frequency resource that is determined by the access network device based on the destination V2X service indication information and that is used to indicate an SL; and sending a V2X service to a second terminal device by using the time-frequency resource.

20 Claims, 7 Drawing Sheets

(51) Int. Cl.
*H04W 72/044* (2023.01)
*H04W 72/20* (2023.01)

(56) References Cited

U.S. PATENT DOCUMENTS

| | | | |
|---|---|---|---|
| 2017/0223723 A1 | 8/2017 | Das et al. | |
| 2017/0230994 A1 | 8/2017 | You et al. | |
| 2018/0368191 A1 | 12/2018 | Vutukuri et al. | |
| 2019/0097877 A1 | 3/2019 | Yiu et al. | |
| 2019/0289459 A1* | 9/2019 | Shan | H04W 76/25 |
| 2020/0145798 A1* | 5/2020 | Kim | H04W 76/14 |
| 2020/0229198 A1* | 7/2020 | Kung | H04W 72/54 |
| 2020/0296569 A1* | 9/2020 | Kumar | H04W 4/027 |
| 2020/0314959 A1* | 10/2020 | Agiwal | H04W 76/14 |
| 2022/0015070 A1* | 1/2022 | Chen | H04W 72/23 |
| 2022/0314949 A1* | 10/2022 | Medveded | B60T 13/166 |
| 2022/0417821 A1* | 12/2022 | Xu | H04W 36/08 |

FOREIGN PATENT DOCUMENTS

| | | | |
|---|---|---|---|
| CN | 106688203 A | 5/2017 | |
| CN | 107360533 A | 11/2017 | |
| CN | 107645735 A | 1/2018 | |
| CN | 107820723 A | 3/2018 | |
| CN | 107846434 A | 3/2018 | |
| CN | 109219131 A | 1/2019 | |
| CN | 109391403 A | 2/2019 | |
| CN | 109561506 A | 4/2019 | |
| EP | 3226444 A1 | 10/2017 | |
| EP | 3439332 A1 | 2/2019 | |
| WO | 2017101207 A1 | 6/2017 | |
| WO | 2019001286 A1 | 1/2019 | |
| WO | 2019037555 A1 | 2/2019 | |

OTHER PUBLICATIONS

Oppo, "Discussion on Inter-RAT Control", 3GPP TSG-RAN WG2 Meeting #105bis, R2-1903215, Xi'an, China, Apr. 8-12, 2019, 6 pages.

Zte et al., "Discussion on LTE and NR Uu based resource allocation and configuration for sidelink", 3GPP TSG-RAN WG2#104, R2-1816997, Spokane, WA, US, Nov. 12-16, 2018, 3 pages.

Zhu, S. et al., "5G Key Technologies and Standardization Status", China Academy of Information and Communications Technology (CAICT), Dec. 2017, 8 pages.

Oppo, "Discussion on Inter-RAT Control", 3GPP TSG-RAN WG2 Meeting #106, R2-1905567, Reno, NV, US, May 13-17, 2019, 6 pages.

Huawei et al., "Introduction of LTE to NR reselection in 36.331", 3GPP TSG-RAN WG2 Meeting #101bis, R2-1805229, Sanya, China, Apr. 16-20, 2018, 22 pages.

* cited by examiner

RESOURCE REQUEST METHOD, RESOURCE ALLOCATION METHOD, APPARATUS, AND MEDIUM

CROSS-REFERENCE TO RELATED APPLICATIONS

This application is a continuation of International Application No. PCT/CN2020/087340, filed on Apr. 27, 2020, which claims priority to Chinese Patent Application No. 201910370988.3, filed on Apr. 30, 2019. The disclosures of the aforementioned applications are herein incorporated by reference in their entireties.

TECHNICAL FIELD

This application relates to the field of communication technologies, and in particular, to a resource request method, a resource allocation method, an apparatus, and a medium.

BACKGROUND

Vehicle-to-everything (V2X) is an important key technology that implements environment perception, information exchange, and collaborative control by using a sensor, an electronic label, and the like mounted on a vehicle. For example, the technology can implement vehicle-to-vehicle (V2V), vehicle-to-pedestrian (V2P), and vehicle-to-infrastructure (V2I) information exchange, and can improve an intelligence level and an autonomous driving capability of vehicles.

In long term evolution (LTE) V2X, only an LTE V2X sidelink (SL) resource is used to transmit a V2X service. A terminal device obtains the LTE V2X SL resource in two manners. In one manner, the terminal device sends a resource request to an access network device, and the access network device allocates the resource to the terminal device. In the other manner, the terminal device may contend for the resource in an LTE V2X SL resource pool broadcast or preconfigured by the access network device.

After new radio NR (NR) V2X is introduced, resources used to transmit a V2X service may include an LTE V2X SL resource and an NR V2X SL resource. In actual applications, different SL resources are used to transmit different V2X services. Therefore, how a terminal device requests, from an access network device, an SL resource required for a V2X service is a current problem that needs to be urgently resolved.

SUMMARY

This application provides a resource request method, a resource allocation method, an apparatus, and a medium. A first terminal device may indicate, to an access network device based on RAT service indication information, a RAT corresponding to a V2X service, and the access network device may configure or schedule, as indicated by the first terminal device, an SL resource of the corresponding RAT for the first terminal device.

According to a first aspect, an embodiment of this application provides a resource request method. A first terminal device receives a first frequency information list and a second frequency information list from an access network device, where the first frequency information list includes at least one piece of first frequency information, and the second frequency information list includes at least one piece of second frequency information. Then, the first terminal device sends resource request information to the access network device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list. The first terminal device receives resource indication information from the access network device, where the resource indication information is a time-frequency resource that is determined by the access network device based on the destination V2X service indication information and that is used to indicate an SL. The first terminal device may send a V2X service to a second terminal device by using the time-frequency resource.

In this technical solution, the destination V2X service indication information corresponds to the first RAT and/or corresponds to the second RAT, the first terminal device may indicate, to the access network device, a RAT corresponding to the V2X service, and the access network device may configure or schedule, as indicated by the first terminal device, an SL resource of the corresponding RAT for the first terminal device.

In an implementation, before sending the resource request information to the access network device, the first terminal device may send a second message to the access network device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before sending the resource request information to the access network device, the first terminal device may send a second message to the access network device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before sending the resource request information to the access network device, the first terminal device may send a second message to the access network device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before sending the resource request information to the access network device, the first terminal device may send a second message to the access network device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; and the second frequency indication information is a second frequency index, and the second frequency index is used to indicate a location of the second frequency information in the second frequency information list.

In an implementation, before sending the second message to the access network device, the first terminal device may obtain first RAT indication information of any V2X service; determine, based on the first RAT indication information, a RAT corresponding to a V2X service identifier used to indicate the V2X service, where the RAT includes the first RAT and/or the second RAT; and generate the second message based on the determined RAT.

In an implementation, before sending the second message to the access network device, the first terminal device may obtain a propagation type of any V2X service; if the propagation type is multicast or unicast, determine that a RAT corresponding to a V2X service identifier used to indicate the V2X service is the first RAT; or if the propagation type is broadcast, obtain first RAT indication information of the V2X service, and determine, based on the first RAT indication information, a RAT corresponding to a V2X service identifier used to indicate the V2X service, where the RAT includes the first RAT and/or the second RAT; and generate the second message based on the determined RAT.

In an implementation, that the first terminal device sends resource request information to the access network device includes: sending a buffer status report BSR to the access network device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

According to a second aspect, an embodiment of this application provides a resource allocation method. An access network device sends a first frequency information list and a second frequency information list to a first terminal device, where the first frequency information list includes at least one piece of first frequency information, and the second frequency information list includes at least one piece of second frequency information; receives resource request information from the first terminal device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list. Then, the access network device generates resource indication information based on the resource request information, where the resource indication information is a time-frequency resource that is determined by the access network device based on the destination V2X service indication information and that is used to indicate a sidelink SL, the time-frequency resource corresponds to a RAT, and the RAT includes the first RAT and/or the second RAT; and sends the resource indication information to the first terminal device.

In an implementation, before receiving the resource request information from the first terminal device, the access network device may receive a second message from the first terminal device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before receiving the resource request information from the first terminal device, the access network device may receive a second message from the first terminal device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before receiving the resource request information from the first terminal device, the access network device may receive a second message from the first terminal device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before receiving the resource request information from the first terminal device, the access network device may receive a second message from the first terminal device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; the second frequency indication information is a second frequency index, and the second frequency index is used to indicate a location of the second frequency information in the second frequency information list; and the first frequency indication information list corresponds to the first RAT, and the second frequency indication information list corresponds to the second RAT.

In an implementation, that the access network device receives resource request information from the first terminal device includes: receiving a buffer status report BSR from the first terminal device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

In an implementation, that the access network device generates resource indication information based on the resource request information includes: determining, based on the destination V2X service indication information, a RAT and frequency information that are used to transmit a V2X service; and generating the resource indication information based on the RAT and the frequency information.

According to a third aspect, an embodiment of this application provides a communication apparatus, where the communication apparatus includes a unit configured to implement the resource request method according to the first aspect.

According to a fourth aspect, an embodiment of this application provides a communication apparatus, where the communication apparatus includes a unit configured to implement the resource allocation method according to the second aspect.

According to a fifth aspect, an embodiment of this application provides a communication apparatus, including a processor and a memory, where the memory stores program instructions of the apparatus, and the processor is configured to run the program instructions in the memory, so that the apparatus performs the resource request method according to the first aspect.

According to a sixth aspect, an embodiment of this application provides a communication apparatus, including a processor and a memory, where the memory stores program instructions of the apparatus, and the processor is configured to run the program instructions in the memory, so that the apparatus performs the resource allocation method according to the second aspect.

According to a seventh aspect, an embodiment of this application provides a computer storage medium, where the computer storage medium stores a computer program or instructions; and when the program is executed or the instructions are executed by a processor, the processor is enabled to perform the resource request method according to the first aspect.

According to an eighth aspect, an embodiment of this application provides a computer storage medium, where the computer storage medium stores a computer program or instructions; and when the program is executed or the instructions are executed by a processor, the processor is enabled to perform the resource allocation method according to the second aspect.

According to a ninth aspect, an embodiment of this application provides a terminal device. The terminal device includes a processor, a memory, a transmitter, and a receiver. The memory stores program code, and the processor invokes the program code stored in the memory to perform the following operations: receiving a first frequency information list and a second frequency information list from an access network device, where the first frequency information list includes at least one piece of first frequency information, and the second frequency information list includes at least one piece of second frequency information; sending resource request information to the access network device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list; receiving resource indication information from the access network device, where the resource indication information is a time-frequency resource that is determined by the access network device based on the destination V2X service indication information and that is used to indicate a sidelink SL; and sending a V2X service to a second terminal device by using the time-frequency resource.

According to a tenth aspect, an embodiment of this application provides an access network device. The access network device includes a processor, a memory, a transmitter, and a receiver. The memory stores program code, and the processor invokes the program code stored in the memory to perform the following operations: sending a first frequency information list and a second frequency information list to a first terminal device, where the first frequency information list includes at least one piece of first frequency information, and the second frequency information list includes at least one piece of second frequency information; receiving resource request information from the first terminal device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list; generating resource indication information based on the resource request information, where the resource indication information is a time-frequency resource that is determined by the access network device based on the destination V2X service indication information and that is used to indicate a sidelink SL, the time-frequency resource corresponds to a RAT, and the RAT includes the first RAT and/or the second RAT; and sending the resource indication information to the first terminal device.

According to an eleventh aspect, an embodiment of this application provides a chip system. The chip system includes a processor and an interface circuit, and the interface circuit is coupled to the processor.

The processor is configured to execute a computer program or instructions, to implement the method according to the first aspect.

The interface circuit is configured to communicate with another module outside the chip system.

According to a twelfth aspect, an embodiment of this application provides a chip system. The chip system includes a processor and an interface circuit, and the interface circuit is coupled to the processor.

The processor is configured to execute a computer program or instructions, to implement the method according to the second aspect.

The interface circuit is configured to communicate with another module outside the chip system.

BRIEF DESCRIPTION OF THE DRAWINGS

To describe the technical solutions in embodiments of this application or in the background more clearly, the following briefly describes the accompanying drawings for describing the embodiments of this application or the background.

DETAILED DESCRIPTION OF ILLUSTRATIVE EMBODIMENTS

The following describes the embodiments of this application with reference to the accompanying drawings in the embodiments of this application.

Figure 1:
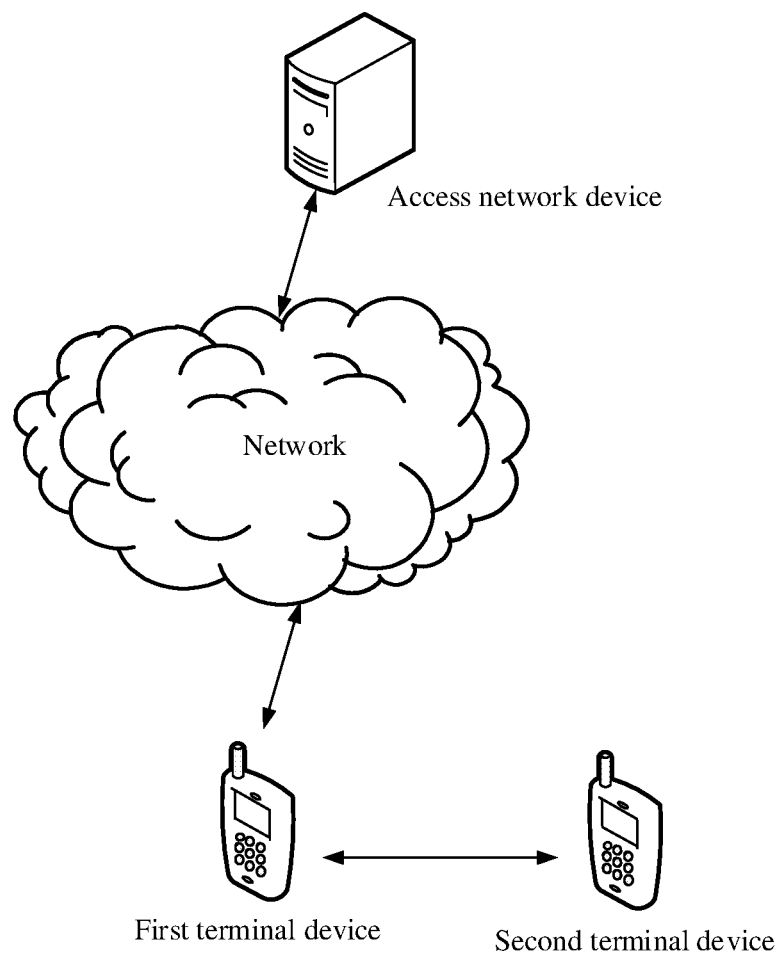
FIG. 1 is a schematic diagram of a structure of a communication system according to an embodiment of this application.

To better understand a resource request method, a resource allocation method, an apparatus, and a medium that are disclosed in the embodiments of this application, the following first describes a communication system in the embodiments of this application. FIG. 1 is a schematic diagram of a structure of a communication system according to an embodiment of this application. The communication system may include at least one first terminal device 101, at least one second terminal device 102, and an access network device 103. The first terminal device 101 separately sets up a communication connection to the access network device 103 and the second terminal device 102.

In long term evolution LTE V2X, only an LTE V2X SL resource is used to transmit a V2X service. After NR V2X is introduced, resources used to transmit a V2X service may include an LTE V2X SL resource and an NR V2X SL resource. In actual applications, different SL resources are used to transmit different V2X services. For example, some V2X services are transmitted only by using LTE V2X SL resources, some V2X services are transmitted only by using NR V2X SL resources, some V2X services can be transmitted by using LTE V2X SL resources or NR V2X SL resources, and some V2X services can be transmitted by using both LTE V2X SL resources and NR V2X SL resources. Therefore, how the first terminal device 101 requests, from the access network device 103, an SL resource required for a V2X service is a problem that needs to be urgently resolved currently.

In this embodiment of this application, the access network device 103 sends a first frequency information list and a second frequency information list to the first terminal device 101. When requesting the resource used to transmit the V2X service, the first terminal device 101 may determine a radio access technology (RAT) of a V2X SL corresponding to the V2X service, and further send resource request information to the access network device 103. The resource request information carries destination V2X service indication information, the destination V2X service indication information corresponds to a first RAT and/or corresponds to a second RAT, the first RAT corresponds to the first frequency information list, and the second RAT corresponds to the second frequency information list. The access network device 103 generates resource indication information based on the destination V2X service indication information, and sends the resource indication information to the first terminal device 101. Then, the first terminal device 101 may send the V2X service to the second terminal device 102 by using a time-frequency resource that is on the SL and that is indicated by the resource indication information. In this embodiment of this application, the first terminal device 101 sends the resource request information to the access network device 103, and the access network device 103 may determine, based on the destination V2X service indication information carried in the resource request information, that the resource requested by the first terminal device 101 is an NR V2X SL resource, an LTE V2X SL resource, or an NR V2X SL resource and an LTE V2X SL resource.

The technical solutions in the embodiments of the present invention may be applied to various communication systems, for example, a global system for mobile communications (GSM) system, a code division multiple access (CDMA) system, a wideband code division multiple access (WCDMA) system, a general packet radio service (GPRS) system, a universal mobile telecommunications system (UMTS), a worldwide interoperability for microwave access (WiMAX) communication system, a fifth generation (5G) communication system, a 5G new radio (NR) communication system, NR, an ultra-reliable low-latency communication (URLLC) system, a narrowband internet of things (NB-IoT), an enhanced machine type communication (eMTC) system, and the like.

In the embodiments of the present invention, the access network device corresponds to the first RAT. The access network device may be specifically any one of an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB), a relay station or an access point, a vehicle-mounted device, or a wearable device in an LTE system, an access network device in a 5G network, an access network device in a future evolved public land mobile network (PLMN), and the like.

The first terminal device or the second terminal device may also be referred to as user equipment (UE), a mobile station, an access terminal, a subscriber unit, a subscriber station, a remote station, a remote terminal, a mobile device, a terminal, a wireless communication device, a user agent, a user apparatus, or the like. The first terminal device or the second terminal device may be specifically any one of a station (ST) in a WLAN, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a terminal device in a future evolved PLMN, and the like.

The first frequency information list may include at least one piece of first frequency information, and the first frequency information list corresponds to the first RAT, that is, the first frequency information included in the first frequency information list corresponds to the first RAT. For example, the first RAT may be NR, the first frequency information list may be an NR sidelink frequency information list, and the first frequency information may be NR sidelink frequency information and is used to indicate, to the first terminal device, an NR sidelink frequency supported by a current cell. The second frequency information list may include at least one piece of second frequency information, and the second frequency information list corresponds to the second RAT, that is, the second frequency information included in the second frequency information list corresponds to the second RAT. For example, the second RAT may be LTE, the second frequency information list may be an LTE sidelink frequency information list, and the second frequency information may be LTE sidelink frequency information and is used to indicate, to the first terminal device, an LTE sidelink frequency supported by a current cell. The frequency information in the embodiments of this application may be an absolute radio channel number (ARFCN) value, and an ARFCN value correspond one-to-one to a frequency. Frequencies corresponding to the first frequency information and the second frequency information may be the same or different.

In this embodiment of this application, before transmitting the V2X service to the second terminal device, the first terminal device may send the resource request information to the access network device, to request the resource required for transmitting the V2X service. The resource request information may carry the destination V2X service indication information, and the destination V2X service indication information may include a destination V2X service identifier (for example, a destination ID) or a destination index.

The destination V2X service identifier corresponds to first frequency indication information and/or second frequency indication information, the first frequency indication information corresponds to the first RAT, and the second frequency indication information corresponds to the second RAT. A V2X layer of the first terminal device may determine the destination V2X service identifier corresponding to the V2X service, and a service type may be represented by using a V2X service identifier.

The destination index is used to indicate a location of the destination V2X service identifier in first V2X service information, and each entry in the first V2X service information includes one V2X service identifier and at least one piece of frequency indication information corresponding to the V2X service identifier. For example, if the destination index is M, it indicates that the destination V2X service identifier is an $M^{th}$ entry in the first V2X service information, that is, the destination V2X service identifier is an $M^{th}$ $V_2X$ service identifier in the first V2X service information, where M is a positive integer. Alternatively, if the destination index is M, it indicates that the destination V2X service identifier is an $(M+1)^{th}$ entry in the first V2X service information, that is, the destination V2X service identifier is an $(M+1)^{th}$ V2X service identifier in the first V2X service information, where M is a positive integer.

The first frequency indication information may be a first frequency index or ARFCN value. The first frequency index is used to indicate a location of the first frequency information in the first frequency information list. For example, if the first frequency index is $N_1$, it indicates that the first frequency information is an $N_1^{th}$ entry in the first frequency information list, that is, the first frequency information is an $N_1^{th}$ piece of frequency information in the first frequency information list, where $N_1$ is a positive integer. For another example, if the first frequency index is $N_1$, it indicates that the first frequency information is an $(N_1+1)^{th}$ entry in the first frequency information list, that is, the first frequency information is an $(N_1+1)^{th}$ piece of frequency information in the first frequency information list, where $N_1$ is a positive integer.

The second frequency indication information may be a second frequency index or ARFCN value. The second frequency index is used to indicate a location of the second frequency information in the second frequency information list. For example, if the second frequency index is $N_2$, it indicates that the second frequency information is an $N_2^{th}$ entry in the second frequency information list, that is, the second frequency information is an $N_2^{th}$ piece of frequency information in the second frequency information list, where $N_2$ is a positive integer. For another example, if the second frequency index is $N_2$, it indicates that the second frequency information is an $(N_2+1)^{th}$ entry in the second frequency information list, that is, the second frequency information is an $(N_2+1)^{th}$ piece of frequency information in the second frequency information list, where $N_2$ is a positive integer.

The first frequency indication information list may include at least one piece of first frequency indication information. The second frequency indication information list may include at least one piece of second frequency indication information.

In an implementation, for a solution in which the first frequency indication information is the first frequency index and the second frequency indication information is the second frequency index, before receiving the resource request information from the first terminal device, the access network device may send the first frequency information list and the second frequency information list to the first terminal device. For example, the access network device may broadcast the first frequency information list and the second frequency information list when broadcasting a cell system message. For example, the first frequency information list and the second frequency information list that are broadcast by the access network device may be transmitted in one system information block (SIB). For another example, the first frequency information list may be transmitted in a first SIB, and the second frequency information list may be transmitted in a second SIB. The first SIB is used to indicate NR V2X related information, and the second SIB is used to indicate LTE V2X related information.

In an implementation, the first terminal device may send the resource request information to the access network device in the following two manners.

1. The first terminal device sends a first message to the access network device, where the first message carries the destination V2X service identifier and a service model corresponding to the destination V2X service identifier. The first message is used to request a V2X SL resource from the access network device. For example, the first message may be a UE assistance information (UAI) message. An example in which the first message is the UAI message is used for description below. The first terminal device may report the service model to the access network device, and request the access network device to generate a semi-persistent scheduling (SPS) configuration or a configured grant (CG) resource for the first terminal device. The configured grant resource may also be referred to as a configured grant. Both the SPS configuration and the CG may be understood as SL grant resources provided by the access network device for the first terminal device by using radio resource control (RRC) signaling. The first terminal device may transmit SL data by using the SL grant resource. The SL grant resource is a periodic SL grant resource, and a periodicity is configured by the access network device for the first terminal device. For example, if the first terminal device requests an NR V2X SL resource, the access network device may generate the CG resource for the first terminal device. If the first terminal device requests an LTE V2X SL resource, the access network device may generate the SPS configuration for the first terminal device.

2. The first terminal device sends a buffer status report (BSR) to the access network device, where the BSR carries the destination index and a buffer size corresponding to the destination index. In addition to performing SL communication in the foregoing manner of requesting the configured grant resource, the first terminal device may further request dynamic scheduling in a manner of reporting the BSR, to obtain an SL resource. Specifically, when the V2X service corresponding to the destination V2X service identifier needs to be transmitted, the first terminal device may report the BSR to the access network device, where the BSR carries the destination index.

In an implementation, before sending the resource request information to the access network device, the first terminal device may send a second message to the access network device. The second message is used to report V2X service related information to the access network device. For example, the second message may be a sidelink user equipment information (SUI) message. An example in which the second message is the SUI message is used for description below.

In an implementation, the V2X layer of the first terminal device may determine, in the following two manners, a RAT of a V2X SL corresponding to a V2X service that the first terminal device is interested in.

1. The V2X layer of the first terminal device obtains first RAT indication information of the V2X service, and determines, based on the first RAT indication information, the RAT corresponding to a V2X service identifier used to indicate the V2X service, where the RAT includes the first RAT and/or the second RAT.

2. The V2X layer of the first terminal device obtains a propagation type of the V2X service. If the propagation type is multicast or unicast, the V2X layer of the first terminal device determines that the RAT corresponding to a V2X service identifier used to indicate the V2X service is the first RAT. If the propagation type is broadcast, the V2X layer of the first terminal device may obtain first RAT indication information of the V2X service from the first terminal device, and determine, based on the first RAT indication information, the RAT corresponding to a V2X service identifier used to indicate the V2X service, where the RAT includes the first RAT and/or the second RAT.

When the propagation type is broadcast, the destination ID may be used to identify the V2X service or a type of the V2X service. When the propagation type is unicast, the destination ID may be an identifier allocated by the first terminal device to a unicast connection, and may be used to identify the first terminal device. When the propagation type is multicast, the destination ID may be used to identify a group.

In an implementation, the destination V2X service identifier may be determined by the V2X layer of the first terminal device. If the RAT corresponding to the destination V2X service identifier in the second message includes the first RAT and the second RAT, and the first terminal device requests an NR V2X SL resource or an LTE V2X SL resource from the access network device, the resource request information sent by the first terminal device to the access network device may further carry destination RAT indication information. In other words, if the RAT corresponding to the destination V2X service identifier in the second message includes the first RAT and the second RAT, the first terminal device may determine that the V2X service corresponding to the destination V2X service identifier is stored at an access stratum (AS) corresponding to the first RAT and/or an AS corresponding to the second RAT. If the V2X service corresponding to the destination V2X service identifier is stored at the AS corresponding to the first RAT, the first terminal device requests an NR V2X SL resource, and the first terminal device may generate destination RAT indication information used to indicate the first RAT. If the V2X service corresponding to the destination V2X service identifier is stored at the AS corresponding to the second RAT, the first terminal device requests an LTE V2X SL resource, and the first terminal device may generate destination RAT indication information used to indicate the second RAT. If the V2X service corresponding to the destination V2X service identifier is stored at the AS corresponding to the first RAT and the AS corresponding to the second RAT, the first terminal device requests an LTE V2X SL resource and an NR V2X SL resource, and the first terminal device does not need to generate the destination RAT indication information.

Figure 2:
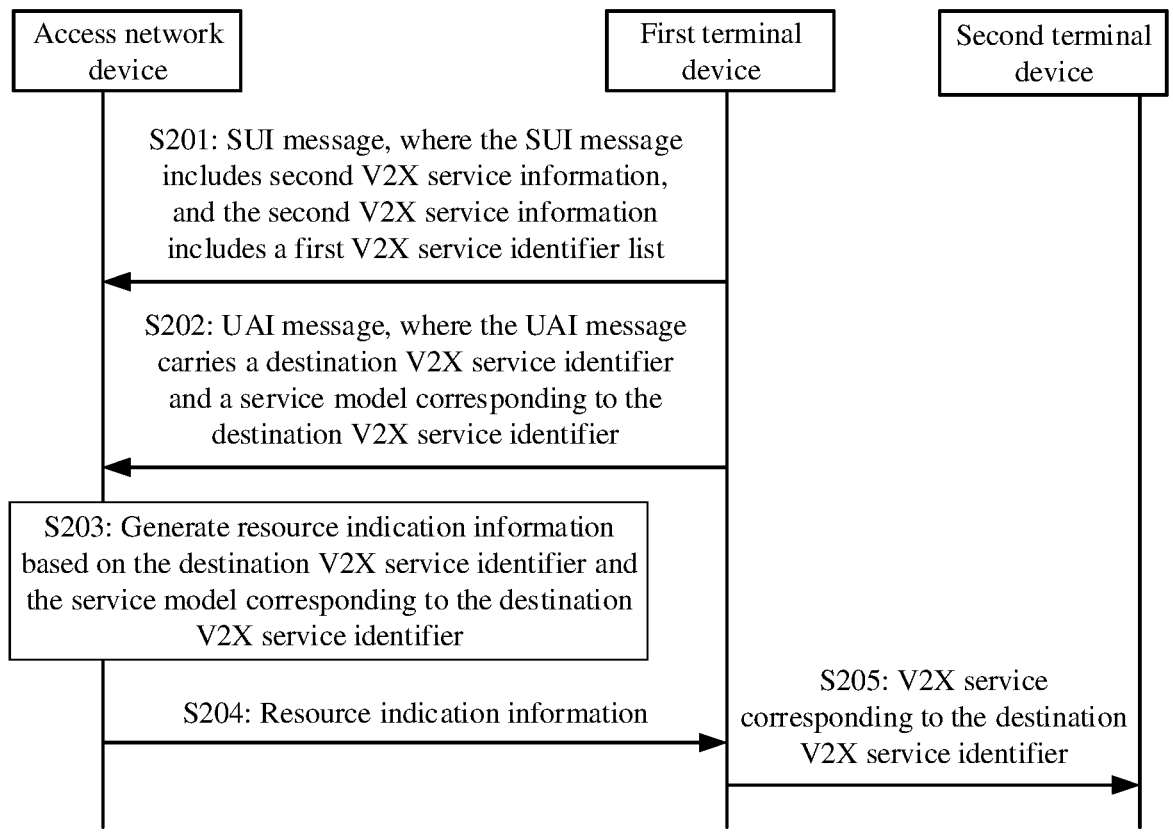
FIG. 2 is a schematic flowchart of a resource allocation method according to an embodiment of this application.

Based on the communication system shown in FIG. 1, FIG. 2 is a resource allocation method according to an embodiment of this application. The method includes but is not limited to the following steps.

Step S201: The first terminal device sends an SUI message to the access network device, where the SUI message includes second V2X service information, the second V2X service information includes a first V2X service identifier list, and each entry in the first V2X service identifier list includes one V2X service identifier and a first frequency indication information list corresponding to the V2X service identifier.

In this embodiment of this application, the access network device is an NR gNB.

Optionally, in this embodiment of this application, the SUI message may include two pails, for example, a first part and a second part. The first part includes the second V2X service information, and the second V2X service information includes a destination ID of a RAT being NR. The second part is a container (container), and a specific information element format may be an OCTET STRING. The container includes a frequency indication information list, and each entry in the frequency indication information list includes one piece of frequency indication information and a destination ID list corresponding to the frequency indication information.

In a specific implementation, the V2X layer of the first terminal device may obtain at least one V2X service identifier that the first terminal device is interested in, and then determine a RAT of a V2X SL corresponding to each V2X service identifier. If the RAT of the V2X SL corresponding to each V2X service identifier is a first RAT, the V2X layer of the first terminal device may obtain, based on at least one piece of first frequency information corresponding to any V2X service identifier, a first frequency indication information list corresponding to the V2X service identifier. The V2X layer of the first terminal device may generate the second V2X service information based on the at least one V2X service identifier and the first frequency indication information list corresponding to each V2X service identifier. The V2X layer of the first terminal device may generate the SUI message including the second V2X service information, where the second V2X service information is located in the first part of the SUI message, and the first terminal device sends the SUI message to the access network device.

TABLE 1

| Second V2X service information | |
|---|---|
| First V2X service identifier list | |
| Destination ID 1 | First frequency indication information list 1 |
| Destination ID 2 | First frequency indication information list 2 |

The second V2X service information shown in Table 1 is used as an example. A destination ID is used to represent a V2X service identifier, and V2X service identifiers that the first terminal device is interested in include the destination ID 1 and the destination ID 2. The V2X layer of the first terminal device determines that a RAT of a V2X SL corresponding to the destination ID 1 is the first RAT. The first frequency indication information list 1 includes at least one piece of first frequency indication information corresponding to the destination ID 1, and the first frequency indication information list 1 corresponds to the destination ID 1. The V2X layer of the first terminal device determines that a RAT of a V2X SL corresponding to the destination ID 2 is the first RAT. The first frequency indication information list 2 includes at least one piece of first frequency indication information corresponding to the destination ID 2, and the first frequency indication information list 2 corresponds to the destination ID 2.

In an implementation, the first terminal device may send an SUI message to the access network device, where the SUI message includes second V2X service information and third V2X service information. The second V2X service information includes a first V2X service identifier list, and each entry in the first V2X service identifier list includes one V2X service identifier and a first frequency indication information list corresponding to the V2X service identifier. The third V2X service information includes a third frequency indication information list, and each entry in the third frequency indication information list includes one piece of second frequency indication information and at least one V2X service identifier corresponding to the second frequency indication information.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to a V2X service identifier is a first RAT, the V2X layer of the first terminal device may obtain, based on at least one piece of first frequency information corresponding to the V2X service identifier, a first frequency indication information list corresponding to the V2X service identifier. The V2X layer of the first terminal device may generate the second V2X service information based on the at least one V2X service identifier and the first frequency indication information list corresponding to each V2X service identifier. If a RAT of a V2X SL corresponding to another V2X service identifier is a second RAT, the V2X layer of the first terminal device may obtain at least one piece of second frequency information that the first terminal device is interested in, where each piece of second frequency information corresponds to at least one V2X service identifier. Then, the V2X layer of the first terminal device may obtain second frequency indication information used to indicate each piece of second frequency information, and obtain at least one V2X service identifier corresponding to each piece of second frequency indication information, where the at least one V2X service identifier corresponding to the second frequency indication information is the at least one V2X service identifier corresponding to the second frequency information indicated by the second frequency indication information. The V2X layer of the first terminal device may generate the third V2X service information based on at least one piece of second frequency indication information and at least one V2X service identifier corresponding to each piece of second frequency indication information. Then, the V2X layer of the first terminal device may generate the SUI message including the second V2X service information and the third V2X service information, where the second V2X service information is located in a first part of the SUI message, and the third V2X service information is located in a second part of the SUI message. The first terminal device may send the SUI message to the access network device.

TABLE 2

Third V2X service information
Third frequency indication information list

| Second frequency indication information 1 | Destination ID list 1 |
| Second frequency indication information 2 | Destination ID list 2 |

The third V2X service information shown in Table 2 is used as an example. A destination ID is used to represent a V2X service identifier, frequency information that the first terminal device is interested in is second frequency information 1 and second frequency information 2, the second frequency information 1 corresponds to at least one destination ID, and the second frequency information 2 corresponds to at least one destination ID. Frequency indication information used to indicate the second frequency information 1 is the second frequency indication information 1, and frequency indication information used to indicate the second frequency information 2 is the second frequency indication information 2. The destination ID list 1 includes the at least one destination ID corresponding to the second frequency information 1, and the second frequency indication information 1 corresponds to the destination ID list 1. The destination ID list 2 includes the at least one destination ID corresponding to the second frequency information 2, and the second frequency indication information 2 corresponds to the destination ID list 2.

For example, if RATs of V2X SLs corresponding to a V2X service identifier that the first terminal device is interested in are the first RAT and the second RAT, the V2X service identifier may exist in both the second V2X service information and the third V2X service information; in other words, the V2X service identifier may exist in both the first part and the second part of the SUI message.

In an implementation, the first terminal device may send an SUI message to the access network device, where the SUI message includes third V2X service information.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to each V2X service identifier is a second RAT, the V2X layer of the first terminal device may obtain at least one piece of second frequency information that the first terminal device is interested in, where each piece of second frequency information corresponds to at least one V2X service identifier. Then, the V2X layer of the first terminal device may obtain second frequency indication information used to indicate each piece of second frequency information, and obtain at least one V2X service identifier corresponding to each piece of second frequency indication information, where the at least one V2X service identifier corresponding to the second frequency indication information is the at least one V2X service identifier corresponding to the second frequency information indicated by the second frequency indication information. The V2X layer of the first terminal device may generate the third V2X service information based on at least one piece of second frequency indication information and at least one V2X service identifier corresponding to each piece of second frequency indication information. Then, the V2X layer of the first terminal device may generate the SUI message including the third V2X service information, where the third V2X service information is located in a second part of the SUI message. Then, the first terminal device may send the SUI message to the access network device.

Step S202: The first terminal device sends a UAI message to the access network device, where the UAI message carries a destination V2X service identifier and a service model corresponding to the destination V2X service identifier.

In this embodiment of this application, before sending a V2X service to the second terminal device, the first terminal device may obtain a destination V2X service identifier corresponding to the V2X service, and generate a UAI message including the destination V2X service identifier and a service model corresponding to the destination V2X service identifier. Then, the first terminal device sends the UAI message to the access network device. For example, the UAI message may include two parts: a first part and a second part. The first part is information used to request an NR V2X SL resource. The information may include a V2X service identifier and a service model corresponding to the V2X service identifier, and the information may further include a quality of service (QoS) parameter corresponding to the V2X service identifier. The second part is a container, and a specific information element format may be an OCTET STRING. The second part is information used to request an LTE V2X SL resource. The information may include a V2X service identifier and a service model corresponding to the V2X service identifier, and the information may further include a QoS parameter corresponding to the V2X service identifier.

In an implementation, if the first terminal device requests the NR V2X SL resource, the destination V2X service identifier and the service model corresponding to the destination V2X service identifier may be located in the first part of the UAI message, and the first part may further include a QoS parameter corresponding to the destination V2X service identifier.

In an implementation, if the first terminal device requests the LTE V2X SL resource, the destination V2X service identifier and the service model corresponding to the destination V2X service identifier may be located in the second part of the UAI message, and the second part may further include a QoS parameter corresponding to the destination V2X service identifier.

In an implementation, if the first terminal device requests the NR V2X SL resource and the LTE V2X SL resource, the destination V2X service identifier and the service model corresponding to the destination V2X service identifier may be located in the first part of the UAI message, and the first part may further include a QoS parameter corresponding to the destination V2X service identifier. In addition, the destination V2X service identifier and the service model corresponding to the destination V2X service identifier are also located in the second part of the UAI message, and the second part may further include the QoS parameter corresponding to the destination V2X service identifier. That is, for a destination V2X service identifier whose corresponding RATs are the first RAT and the second RAT, the first terminal device always includes the destination V2X service identifier in content of the two parts of the UAI message. Optionally, the first terminal device may alternatively determine whether the destination V2X service identifier needs to be included in the two parts. It should be noted that the QoS parameter corresponding to the destination V2X service identifier in the first part and the QoS parameter corresponding to the destination V2X service identifier in the second part may be in a same form or may be in different forms.

In this embodiment, only an example in which the access network device is an NR access network device is used for description. Therefore, during reporting, the first terminal device reports LTE V2X related information in a form of a container. If the access network device is an LTE access network device, the first terminal device reports NR V2X related information in a form of a container, that is, the first terminal device reports inter-RAT (inter-RAT) V2X related information to the access network device in a form of a container. Inter-RAT means that a RAT used by the first terminal device for V2X communication is different from a RAT of an air interface of the access network device.

Step S203: The access network device generates resource indication information based on the destination V2X service identifier and the service model corresponding to the destination V2X service identifier, where the resource indication information is a time-frequency resource used to indicate an SL, the time-frequency resource corresponds to a RAT, and the RAT includes the first RAT and/or the second RAT.

After receiving the UAI message, the access network device may determine that the destination V2X service identifier is included in the first part and/or the second part of the UAI message. If the destination V2X service identifier is included in the first part of the UAI message, the access network device may determine that the first terminal device requests the NR V2X SL resource, then search the second V2X service information for at least one piece of first frequency indication information corresponding to the destination V2X service identifier, and determine a time-frequency resource based on the at least one piece of first frequency indication information and the service model that correspond to the destination V2X service identifier. Then, the first access network device may generate the resource indication information based on the time-frequency resource used to indicate an NR V2X SL.

If the destination V2X service identifier is included in the second part of the UAI message, the access network device may determine that the first terminal device requests the LTE V2X SL resource, then search the third V2X service information for at least one piece of second frequency indication information corresponding to the destination V2X service identifier, and determine a time-frequency resource based on the at least one piece of second frequency indication information and the service model that correspond to the destination V2X service identifier. Then, the first access network device may generate the resource indication information based on the time-frequency resource used to indicate an LTE V2X SL.

If the destination V2X service identifier is included in the first part and the second part of the UAI message, the access network device may determine that the first terminal device requests the NR V2X SL resource and the LTE V2X SL resource, then search the second V2X service information for at least one piece of first frequency indication information corresponding to the destination V2X service identifier and search the third V2X service information for at least one piece of second frequency indication information corresponding to the destination V2X service identifier, and determine time-frequency resources based on the at least one piece of first frequency indication information, the at least one piece of second frequency indication information, and the service model that correspond to the destination V2X service identifier. Then, the access network device may generate the resource indication information based on the time-frequency resource used to indicate an NR V2X SL and the time-frequency resource used to indicate an LTE V2X SL.

Step S204: The access network device sends the resource indication information to the first terminal device.

Step S205: The first terminal device sends the V2X service corresponding to the destination V2X service identifier to the second terminal device by using the time-frequency resource.

In the method described in FIG. 2, the first terminal device implicitly indicates, to the access network device, the RAT corresponding to the destination V2X service identifier, and the access network device may configure or schedule, based on the RAT indication that corresponds to the destination V2X service identifier and that is reported by the first terminal device, the SL resource of the corresponding RAT for the first terminal device.

Figure 3:
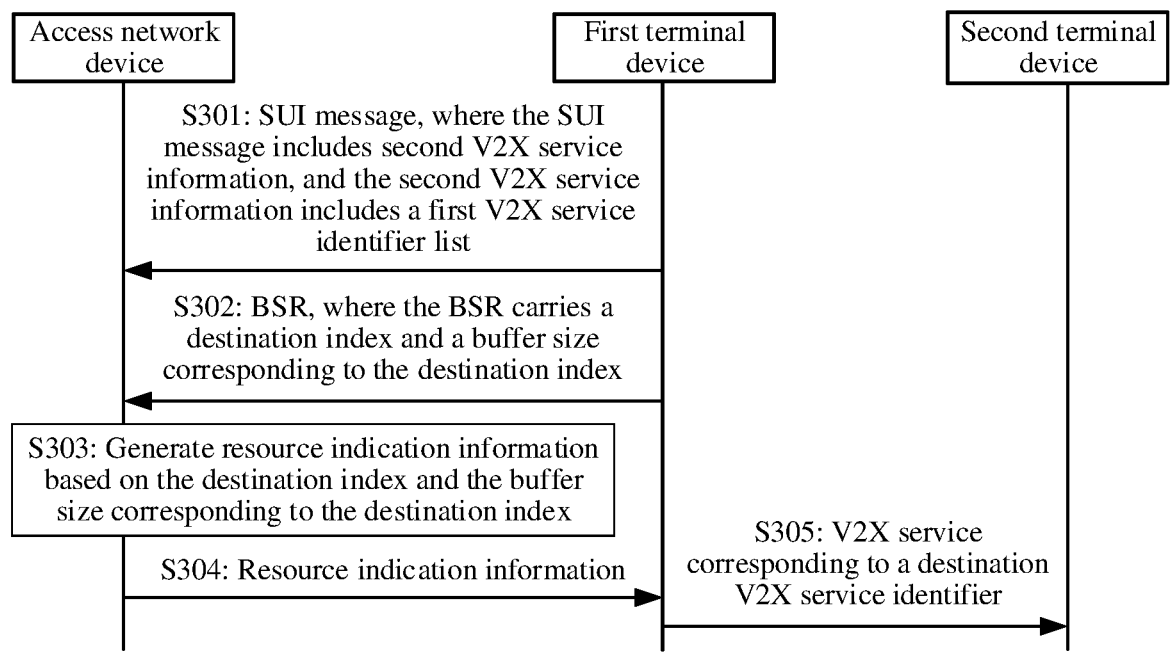
FIG. 3 is another schematic flowchart of a resource allocation method according to an embodiment of this application.

Based on the communication system shown in FIG. 1, FIG. 3 is another resource allocation method according to an embodiment of this application. The method includes but is not limited to the following steps.

Step S301: The first terminal device sends an SUI message to the access network device, where the SUI message includes second V2X service information, the second V2X service information includes a first V2X service identifier list, and each entry in the first V2X service identifier list includes one V2X service identifier and a first frequency indication information list corresponding to the V2X service identifier.

For step S301 in this embodiment of this application, refer to the specific description of step S201 in the foregoing embodiment. Details are not described again in this embodiment of this application.

Step S302: The first terminal device sends a BSR to the access network device, where the BSR carries a destination index and a buffer size corresponding to the destination index.

In this embodiment of this application, before sending a V2X service to the second terminal device, the first terminal device may obtain a destination index corresponding to the V2X service, and generate a BSR including the destination index and a buffer size corresponding to the destination index. Then, the first terminal device sends the BSR to the access network device.

In an implementation, if the access network device does not support inter-RAT SL flexible scheduling, that is, the access network device can schedule only an NR V2X SL resource by using downlink control information (DCI), first V2X service information may be the second V2X service information, to be specific, the destination index carried in the BSR is used to indicate a location of a destination V2X service identifier in the second V2X service information, that is, the destination V2X service identifier may be located in a first part of the SUI message.

In an implementation, if the access network device supports inter-RAT SL flexible scheduling, that is, the access network device can schedule an NR V2X SL resource and an LTE V2X SL resource by using DCI, first V2X service information may be fourth V2X service information, to be specific, the destination index carried in the BSR is used to indicate a location of a destination V2X service identifier in the fourth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list.

TABLE 3

Fourth V2X service information

| First V2X service identifier list | Destination ID 1 | First frequency indication information list 1 |
|---|---|---|
| | Destination ID 2 | First frequency indication information list 2 |
| Second V2X service identifier list | Destination ID 1 | Second frequency indication information list 1 |
| | Destination ID 3 | Second frequency indication information list 2 |
| | Destination ID 4 | Second frequency indication information list 3 |

The fourth V2X service information shown in Table 3 is used as an example. A destination ID is used to represent a V2X service identifier, the first V2X service identifier list is located before the second V2X service identifier list, and the first V2X service identifier list is the first V2X service identifier list included in the second V2X service information. It is assumed that the third frequency indication information list shown in Table 2 includes the second frequency indication information 1 and the second frequency indication information 2, the second frequency indication information 1 corresponds to the destination ID list 1, and the second frequency indication information 2 corresponds to the destination ID list 2. The destination ID list 1 includes the destination ID 1, the destination ID 3, and the destination ID 4, and the destination ID list 2 includes the destination ID 4. For example, the first entry in the second V2X service identifier list shown in Table 3 may include the destination ID 1 and the second frequency indication information list 1 corresponding to the destination ID 1, and the second frequency indication information list 1 includes the second frequency indication information 1. The second entry in the second V2X service identifier list may include the destination ID 3 and the second frequency indication information list 2 corresponding to the destination ID 3, and the second frequency indication information list 2 includes the second frequency indication information 1. The third entry in the second V2X service identifier list may include the destination ID 4 and the second frequency indication information list 3 corresponding to the destination ID 4, and the second frequency indication information list 3 includes the second frequency indication information 1 and the second frequency indication information 2.

TABLE 4

Fourth V2X service information

| First V2X service identifier list | Destination ID 1 | First frequency indication information list 1 |
|---|---|---|
| | Destination ID 2 | First frequency indication information list 2 |
| Second V2X service identifier list | Destination ID 1 | Second frequency indication information 1 |
| | Destination ID 3 | Second frequency indication information 1 |
| | Destination ID 4 | Second frequency indication information 1 |
| | Destination ID 4 | Second frequency indication information 2 |

The fourth V2X service information shown in Table 4 is used as an example. A destination ID is used to represent a V2X service identifier, the first V2X service identifier list is located before the second V2X service identifier list, and the first V2X service identifier list is the first V2X service identifier list included in the second V2X service information. It is assumed that the third frequency indication information list shown in Table 2 includes the second frequency indication information 1 and the second frequency indication information 2, the second frequency indication information 1 corresponds to the destination ID list 1, and the second frequency indication information 2 corresponds to the destination ID list 2. The destination ID list 1 includes the destination ID 1, the destination ID 3, and the destination ID 4, and the destination ID list 2 includes the destination ID 4. For example, the first entry in the second V2X service identifier list shown in Table 4 may include the destination ID 1 and the second frequency indication information 1 corresponding to the destination ID 1. The second entry in the second V2X service identifier list may include the destination ID 3 and the second frequency indication information 1 corresponding to the destination ID 3. The third entry in the second V2X service identifier list may include the destination ID 4 and the second frequency indication information 1 corresponding to the destination ID 4. The fourth entry in the second V2X service identifier list may include the destination ID 4 and the second frequency indication information 2 corresponding to the destination ID 4.

In this embodiment, if the first terminal device requests an NR V2X SL resource or an LTE V2X SL resource, there is one destination index. If the first terminal device requests an NR V2X SL resource and an LTE V2X SL resource, there are two destination indexes.

Step S303: The access network device generates resource indication information based on the destination index and the buffer size corresponding to the destination index, where the resource indication information is a time-frequency resource used to indicate an SL, the time-frequency resource corresponds to a RAT, and the RAT includes a first RAT and/or a second RAT.

In an implementation, if the access network device does not support inter-RAT SL flexible scheduling, after receiving the destination index, the access network device may determine that the first terminal device requests the NR V2X SL resource. Then, the access network device searches, based on the destination index, for the location of the destination V2X service identifier in the second V2X service information, searches the second V2X service information for at least one piece of first frequency indication information corresponding to the destination V2X service identifier, and determines a time-frequency resource based on the at least one piece of first frequency indication information and a buffer size that correspond to the destination V2X service identifier. Then, the first access network device may generate the resource indication information based on the time-frequency resource used to indicate an NR V2X SL.

In an implementation, if the access network device supports inter-RAT SL flexible scheduling, after receiving the destination index, the access network device may search, based on the destination index, for the location of the destination V2X service identifier in the fourth V2X service information, search the fourth V2X service information for at least one piece of first frequency indication information or at least one piece of second frequency indication information corresponding to the destination V2X service identifier, and determine a time-frequency resource based on the at least one piece of first frequency indication information and a buffer size that correspond to the destination V2X service identifier, or determine a time-frequency resource based on the at least one piece of second frequency indication information and a buffer size that correspond to the destination V2X service identifier. Then, the first access network device may generate the resource indication information based on the time-frequency resource used to indicate an NR V2X SL and/or the time-frequency resource used to indicate an LTE V2X SL. Table 3 is used as an example. Assuming that the destination index is 1, the access network device may determine that the first terminal device requests an NR V2X SL resource, and determine a time-frequency resource based on the first frequency indication information list 1 and a buffer size that correspond to the destination ID 1. Assuming that the destination index is 3, the access network device may determine that the first terminal device requests an LTE V2X SL resource, and determine a time-frequency resource based on the second frequency indication information list 1 and a buffer size that correspond to the destination ID 1. Assuming that destination indexes are 1 and 3, the access network device may determine that the first terminal device requests an NR V2X SL resource and an LTE V2X SL resource, determine, based on the first frequency indication information list 1 and a buffer size that correspond to the destination ID 1, a time-frequency resource used to indicate an NR V2X SL, and determine, based on the second frequency indication information list 1 and the buffer size that correspond to the destination ID 1, a time-frequency resource used to indicate an LTE V2X SL.

Step S304: The access network device sends the resource indication information to the first terminal device.

Step S305: The first terminal device sends a V2X service corresponding to the destination V2X service identifier to the second terminal device by using the time-frequency resource.

In the method described in FIG. 3, the first terminal device implicitly indicates, to the access network device, the RAT corresponding to the destination V2X service identifier, and the access network device may configure or schedule, based on the RAT indication that corresponds to the destination V2X service identifier and that is reported by the first terminal device, the SL resource of the corresponding RAT for the first terminal device.

Figure 4:
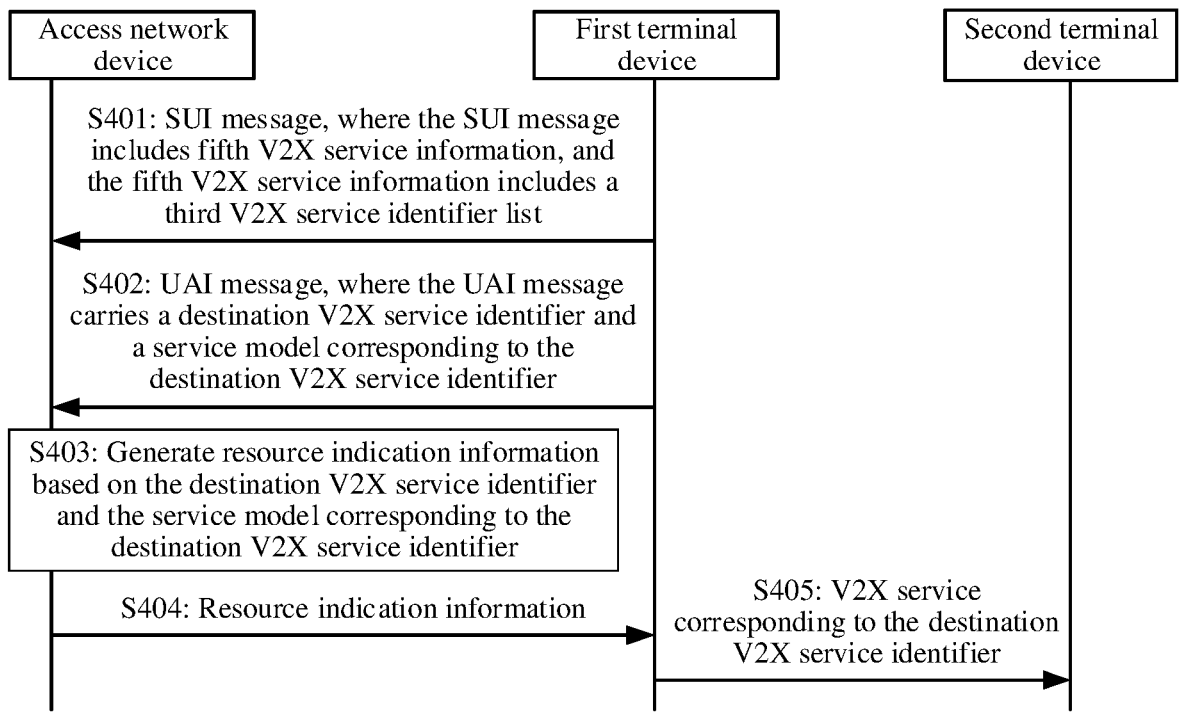
FIG. 4 is another schematic flowchart of a resource allocation method according to an embodiment of this application.

Based on the communication system shown in FIG. 1, FIG. 4 is another resource allocation method according to an embodiment of this application. The method includes but is not limited to the following steps.

Step S401: The first terminal device sends an SUI message to the access network device, where the SUI message includes fifth V2X service information, the fifth V2X service information includes a third V2X service identifier list, and each entry in the third V2X service identifier list includes one V2X service identifier and a first frequency indication information list or a second frequency indication information list corresponding to the V2X service identifier.

In an implementation, at least two same V2X service identifiers may exist in the third V2X service identifier list.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to a V2X service identifier is a first RAT, the V2X layer of the first terminal device may obtain, based on at least one piece of first frequency information corresponding to the V2X service identifier, a first frequency indication information list corresponding to the V2X service identifier. If a RAT of a V2X SL corresponding to another V2X service identifier is a second RAT, the V2X layer of the first terminal device may obtain, based on at least one piece of second frequency information corresponding to the V2X service identifier, a second frequency indication information list corresponding to the V2X service identifier. If RATs of V2X SLs corresponding to another V2X service identifier are a first RAT and a second RAT, the V2X layer of the first terminal device may obtain, based on at least one piece of first frequency information corresponding to the V2X service identifier, a first frequency indication information list corresponding to the V2X service identifier, and obtain, based on at least one piece of second frequency information corresponding to the V2X service identifier, a second frequency indication information list corresponding to the V2X service identifier, where the V2X service identifier appears twice in the third V2X service identifier list.

TABLE 5

| Fifth V2X service information Third V2X service identifier list | |
|---|---|
| Destination ID 1 | First frequency indication information list 1 |
| Destination ID 1 | Second frequency indication information list 1 |
| Destination ID 2 | First frequency indication information list 2 |

The fifth V2X service information shown in Table 5 is used as an example. A destination ID is used to represent a V2X service identifier. The V2X layer of the first terminal device determines that RATs of V2X SLs corresponding to the destination ID 1 are the first RAT and the second RAT. The V2X layer of the first terminal device may obtain at least one piece of first frequency indication information corresponding to the destination ID 1, the first frequency indication information list 1 includes the at least one piece of first frequency indication information corresponding to the destination ID 1, and the first entry in the third V2X service identifier list includes the destination ID 1 and the first frequency indication information list 1 corresponding to the destination ID 1. The V2X layer of the first terminal device may further obtain at least one piece of second frequency indication information corresponding to the destination ID 1, the second frequency indication information list 1 includes the at least one piece of second frequency indication information corresponding to the destination ID 1, and the second entry in the third V2X service identifier list includes the destination ID 1 and the second frequency indication information list 1 corresponding to the destination ID 1. The V2X layer of the first terminal device determines that a RAT of a V2X SL corresponding to the destination ID 2 is the first RAT. The V2X layer of the first terminal device may obtain at least one piece of first frequency indication information corresponding to the destination ID 2, the first frequency indication information list 2 includes the at least one piece of first frequency indication information corresponding to the destination ID 2, and the third entry in the third V2X service identifier list includes the destination ID 2 and the first frequency indication information list 2 corresponding to the destination ID 2.

Step S402: The first terminal device sends a UAI message to the access network device, where the UAI message carries a destination V2X service identifier and a service model corresponding to the destination V2X service identifier.

In this embodiment of this application, before sending a V2X service to the second terminal device, the first terminal device may obtain a destination V2X service identifier corresponding to the V2X service, and generate a UAI message including the destination V2X service identifier and a service model corresponding to the destination V2X service identifier. Then, the first terminal device sends the UAI message to the access network device.

In an implementation, if there are two destination V2X service identifiers in the fifth V2X service information, and the first terminal device requests an NR V2X SL resource, the first terminal device may generate destination RAT indication information, where the destination RAT indication information is used to indicate the first RAT, then the first terminal device may generate a UAI message that includes the destination V2X service identifier, a corresponding service model, and the destination RAT indication information, and send the UAI message to the access network device. If there are two destination V2X service identifiers in the fifth V2X service information, and the first terminal device requests an LTE V2X SL resource, the first terminal device may generate destination RAT indication information, where the destination RAT indication information is used to indicate the second RAT, then the first terminal device may generate a UAI message that includes the destination V2X service identifier, a corresponding service model, and the destination RAT indication information, and send the UAI message to the access network device.

In an implementation, if there are two destination V2X service identifiers in the fifth V2X service information, and the first terminal device requests an NR V2X SL resource and an LTE V2X SL resource, the first terminal device may generate a UAI message that includes the destination V2X service identifiers and service models corresponding to the destination V2X service identifiers, and send the UAI message to the access network device. Optionally, the UAI message carries two sets of QoS parameters. One set corresponds to the first RAT, namely, NR V2X. The other set corresponds to the second RAT, namely, LTE V2X.

In an implementation, if there is one destination V2X service identifier in the fifth V2X service information, the first terminal device may directly generate a UAI message that includes the destination V2X service identifiers and a service model corresponding to the destination V2X service identifier, and send the UAI message to the access network device.

Step S403: The access network device generates resource indication information based on the destination V2X service identifier and the service model corresponding to the destination V2X service identifier, where the resource indication information is a time-frequency resource used to indicate an SL, the time-frequency resource corresponds to a RAT, and the RAT includes the first RAT and/or the second RAT.

After receiving the UAI message, the access network device may search the fifth V2X service information for a frequency indication information list corresponding to the destination V2X service identifier. If the frequency indication information list is the first frequency indication information list, the access network device may determine that the first terminal device requests the NR V2X SL resource, and then determine a time-frequency resource based on at least one piece of first frequency indication information and the service model that correspond to the destination V2X service identifier. Then, the first access network device may generate the resource indication information based on the determined time-frequency resource used to indicate an NR V2X SL.

If the frequency indication information list is the second frequency indication information list, the access network device may determine that the first terminal device requests the LTE V2X SL resource, and then determine a time-frequency resource based on at least one piece of second frequency indication information and the service model that correspond to the destination V2X service identifier. Then, the first access network device may generate the resource indication information based on the determined time-frequency resource used to indicate an LTE V2X SL.

If there are two destination V2X service identifiers in the fifth V2X service information, and the destination V2X service identifier in an entry in the third V2X service identifier list corresponds to the first frequency indication information list, the access network device may determine, based on at least one piece of first frequency indication information and a service model that correspond to the destination V2X service identifier, a time-frequency resource used to indicate an NR V2X SL. If the destination V2X service identifier in another entry in the third V2X service identifier list corresponds to the second frequency indication information list, the access network device may determine, based on at least one piece of second frequency indication information and a service model that correspond to the destination V2X service identifier, a time-frequency resource used to indicate an LTE V2X SL. Then, the first access network device may generate the resource indication information based on the time-frequency resource used to indicate the NR V2X SL and the time-frequency resource used to indicate the LTE V2X SL.

In an implementation, if the UAI message carries the destination RAT indication information, the access network device may determine, based on the destination RAT indication information, whether the first terminal device requests the NR V2X SL resource or the LTE V2X SL resource. If the destination RAT indication information is used to indicate the first RAT, the access network device may determine, based on the at least one piece of first frequency indication information and the service model that correspond to the destination V2X service identifier, and the QoS parameter corresponding to the first RAT, the time-frequency resource used to indicate the NR V2X SL, and generate the resource indication information based on the time-frequency resource used to indicate the NR V2X SL. If the destination RAT indication information is used to indicate the second RAT, the access network device may determine, based on the at least one piece of second frequency indication information and the service model that correspond to the destination V2X service identifier, and the QoS parameter corresponding to the second RAT, the time-frequency resource used to indicate the LTE V2X SL, and generate the resource indication information based on the time-frequency resource used to indicate the LTE V2X SL.

Step S404: The access network device sends the resource indication information to the first terminal device.

Step S405: The first terminal device sends the V2X service corresponding to the destination V2X service identifier to the second terminal device by using the time-frequency resource.

In the method described in FIG. 4, the first terminal device sends the SUI message to the access network device, where the SUI message includes the fifth V2X service information, the fifth V2X service information includes the third V2X service identifier list, and each entry in the third V2X service identifier list includes one V2X service identifier and at least one piece of first frequency indication information or at least one piece of second frequency indication information corresponding to the V2X service identifier. On this basis, after the first terminal device sends the UAI message to the access network device, the access network device may determine, based on the destination V2X service identifier and the fifth V2X service information that are carried in the UAI message, the RAT indication that corresponds to the destination V2X service identifier and that is reported by the first terminal device, and configure or schedule the SL resource of the corresponding RAT for the first terminal device.

Figure 5:
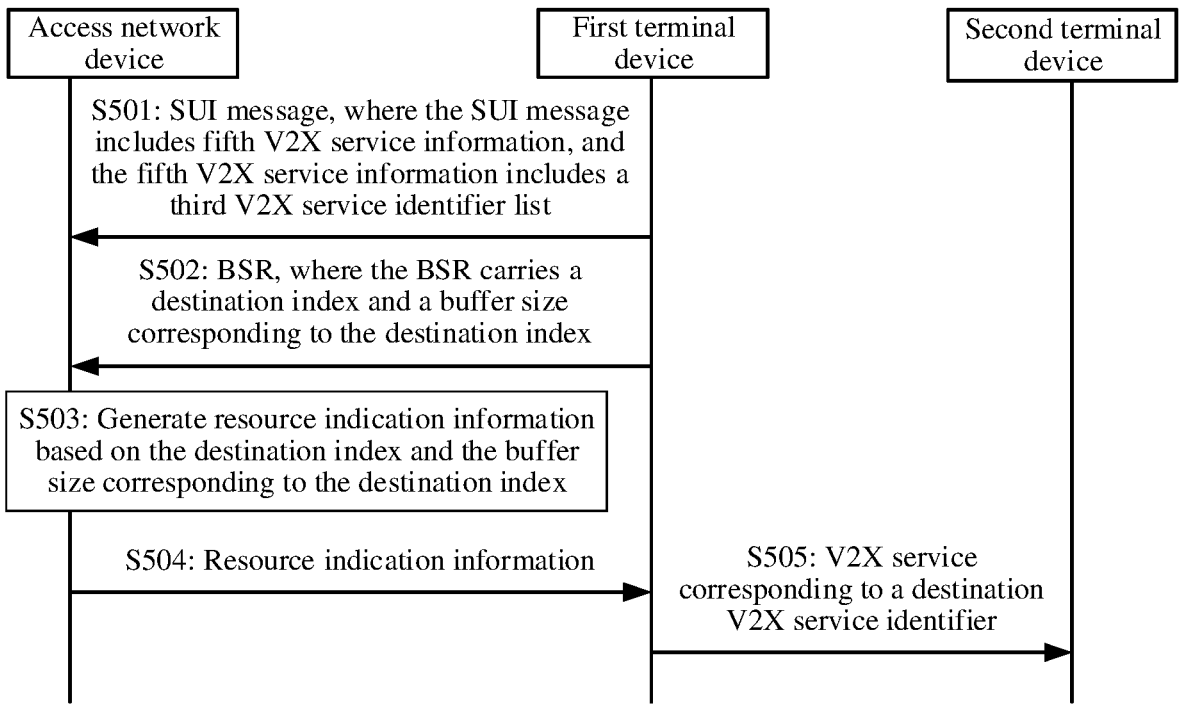
FIG. 5 is another schematic flowchart of a resource allocation method according to an embodiment of this application.

Based on the communication system shown in FIG. 1, FIG. 5 is another resource allocation method according to an embodiment of this application. The method includes but is not limited to the following steps.

Step S501: The first terminal device sends an SUI message to the access network device, where the SUI message includes fifth V2X service information, the fifth V2X service information includes a third V2X service identifier list, and each entry in the third V2X service identifier list includes one V2X service identifier and at least one piece of first frequency indication information or at least one piece of second frequency indication information corresponding to the V2X service identifier.

For step S5oi in this embodiment of this application, refer to the specific description of step S401 in the foregoing embodiment. Details are not described again in this embodiment of this application.

Step S502: The first terminal device sends a BSR to the access network device, where the BSR carries a destination index and a buffer size corresponding to the destination index.

In this embodiment of this application, before sending a V2X service to the second terminal device, the first terminal device may obtain a destination V2X service identifier corresponding to the V2X service and a RAT required for the V2X service, determine a destination index based on the destination V2X service identifier and the RAT corresponding to the destination V2X service identifier, generate a BSR including the destination index and a buffer size corresponding to the destination index, and then send the BSR to the access network device. First V2X service information may be the fifth V2X service information, to be specific, the destination index is used to indicate a location of the destination V2X service identifier in the fifth V2X service information.

In this embodiment, if the first terminal device requests an NR V2X SL resource or an LTE V2X SL resource, there is one destination index. If the first terminal device requests an NR V2X SL resource and an LTE V2X SL resource, there are two destination indexes.

Step S503: The access network device generates resource indication information based on the destination index and the buffer size corresponding to the destination index.

Table 5 is used as an example. Assuming that the destination index is 1, the access network device may determine that the first terminal device requests an NR V2X SL resource, determine, based on the first frequency indication information list 1 and a buffer size that correspond to the destination ID 1, a time-frequency resource used to indicate an NR V2X SL, and generate the resource indication information based on the time-frequency resource used to indicate the NR V2X SL. Assuming that the destination index is 2, the access network device may determine that the first terminal device requests an LTE V2X SL resource, determine, based on the second frequency indication information list 1 and a buffer size that correspond to the destination ID 1, a time-frequency resource used to indicate an LTE V2X SL, and generate the resource indication information based on the time-frequency resource used to indicate the LTE V2X SL. Assuming that destination indexes are 1 and 2, the access network device may determine that the first terminal device requests an NR V2X SL resource and an LTE V2X SL resource, determine, based on the first frequency indication information list 1 and a buffer size that correspond to the destination ID 1, a time-frequency resource used to indicate an NR V2X SL, determine, based on the second frequency indication information list 1 and a buffer size that correspond to the destination ID 1, a time-frequency resource used to indicate an LTE V2X SL, and then generate the resource indication information based on the time-frequency resource used to indicate the LTE V2X SL and the time-frequency resource used to indicate the NR V2X SL.

Step S504: The access network device sends the resource indication information to the first terminal device.

Step S505: The first terminal device sends the V2X service corresponding to the destination V2X service identifier to the second terminal device by using the time-frequency resource.

In the method described in FIG. 5, the first terminal device sends the SUI message to the access network device, where the SUI message includes the fifth V2X service information, the fifth V2X service information includes the third V2X service identifier list, and each entry in the third V2X service identifier list includes one V2X service identifier and at least one piece of first frequency indication information or at least one piece of second frequency indication information corresponding to the V2X service identifier. On this basis, after the first terminal device sends the BSR to the access network device, the access network device may determine, based on the fifth V2X service information and the destination index that is carried in the BSR, the RAT indication that corresponds to the destination V2X service identifier and that is reported by the first terminal device, and configure or schedule the SL resource of the corresponding RAT for the first terminal device.

Figure 6:
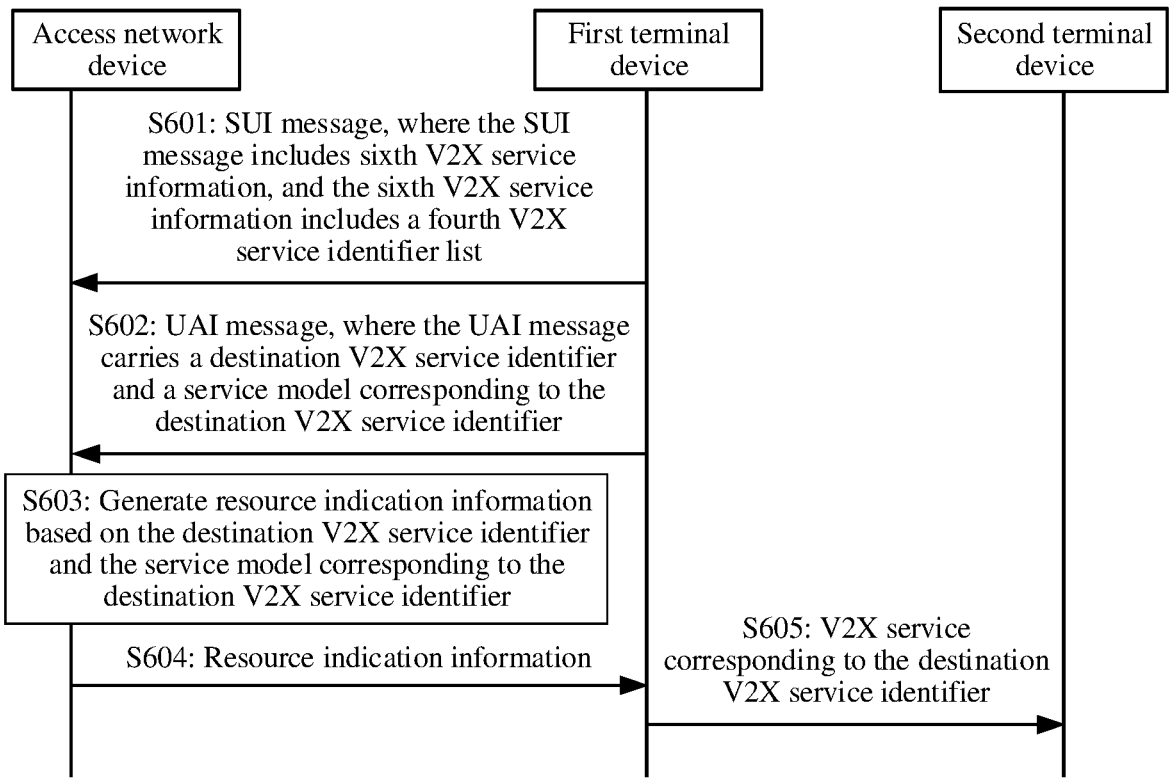
FIG. 6 is another schematic flowchart of a resource allocation method according to an embodiment of this application.

Based on the communication system shown in FIG. 1, FIG. 6 is another resource allocation method according to an embodiment of this application. The method includes but is not limited to the following steps.

Step S601: The first terminal device sends an SUI message to the access network device, where the SUI message includes sixth V2X service information, the sixth V2X service information includes a fourth V2X service identifier list, and each entry in the fourth V2X service identifier list includes one V2X service identifier and a first frequency indication information list corresponding to the V2X service identifier.

In a specific implementation, the V2X layer of the first terminal device may obtain at least one V2X service identifier that the first terminal device is interested in, and then determine a RAT of a V2X SL corresponding to each V2X service identifier. If the RAT of the V2X SL corresponding to each V2X service identifier is a first RAT, the V2X layer of the first terminal device may obtain, based on at least one piece of first frequency information corresponding to any V2X service identifier, a first frequency indication information list corresponding to the V2X service identifier. The V2X layer of the first terminal device may generate the sixth V2X service information based on the at least one V2X service identifier and the first frequency indication information list corresponding to each V2X service identifier. The V2X layer of the first terminal device may generate the SUI message including the sixth V2X service information, and the first terminal device sends the SUI message to the access network device.

TABLE 6

Sixth V2X service information
Fourth V2X service identifier list

| | |
|---|---|
| Destination ID 1 | First frequency indication information list 1 |
| Destination ID 3 | First frequency indication information list 2 |

The sixth V2X service information shown in Table 6 is used as an example. A destination ID is used to represent a V2X service identifier, and V2X service identifiers that the first terminal device is interested in include the destination ID 1 and the destination ID 3. The V2X layer of the first terminal device determines that a RAT of a V2X SL corresponding to the destination ID 1 is the first RAT. The first frequency indication information list 1 includes at least one piece of first frequency indication information corresponding to the destination ID 1, and the first frequency indication information list 1 corresponds to the destination ID 1. The V2X layer of the first terminal device determines that a RAT of a V2X SL corresponding to the destination ID 3 is the first RAT. The first frequency indication information list 2 includes at least one piece of first frequency indication information corresponding to the destination ID 3, and the first frequency indication information list 2 corresponds to the destination ID 3.

In an implementation, the first terminal device may send an SUI message to the access network device, where the SUI message includes sixth V2X service information and seventh V2X service information. The sixth V2X service information includes a fourth V2X service identifier list, and each entry in the fourth V2X service identifier list includes one V2X service identifier and at least one piece of first frequency indication information corresponding to the V2X service identifier. The seventh V2X service information includes a fifth V2X service identifier list, and each entry in the fifth V2X service identifier list includes one V2X service identifier and at least one piece of second frequency indication information corresponding to the V2X service identifier.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to a V2X service identifier is the first RAT, the V2X layer of the first terminal device may obtain, based on at least one piece of first frequency information corresponding to the V2X service identifier, a first frequency indication information list corresponding to the V2X service identifier. The V2X layer of the first terminal device may generate the sixth V2X service information based on the at least one V2X service identifier and the first frequency indication information list corresponding to each V2X service identifier. If a RAT of a V2X SL corresponding to another V2X service identifier is the second RAT, the V2X layer of the first terminal device may obtain, based on at least one piece of second frequency information corresponding to the V2X service identifier, a second frequency indication information list corresponding to the V2X service identifier. The V2X layer of the first terminal device may generate the seventh V2X service information based on the at least one V2X service identifier and the second frequency indication information list corresponding to each V2X service identifier. Then, the V2X layer of the first terminal device may generate the SUI message including the sixth V2X service information and the seventh V2X service information. Then, the first terminal device may send the SUI message to the access network device.

TABLE 7

Seventh V2X service information
Fifth V2X service identifier list

| | |
|---|---|
| Destination ID 1 | Second frequency indication information list 1 |
| Destination ID 2 | Second frequency indication information list 2 |

The seventh V2X service information shown in Table 7 is used as an example. A destination ID is used to represent a V2X service identifier, and V2X service identifiers that the first terminal device is interested in include the destination ID 1 and the destination ID 2. The V2X layer of the first terminal device determines that a RAT of a V2X SL corresponding to the destination ID 1 is the second RAT. The first frequency indication information list 1 includes at least one piece of second frequency indication information corresponding to the destination ID 1, and the second frequency indication information list 1 corresponds to the destination ID 1. The V2X layer of the first terminal device determines that a RAT of a V2X SL corresponding to the destination ID 2 is the second RAT. The second frequency indication information list 2 includes at least one piece of second frequency indication information corresponding to the destination ID 2, and the second frequency indication information list 2 corresponds to the destination ID 2.

For example, if RATs of V2X SLs corresponding to a V2X service identifier that the first terminal device is interested in are the first RAT and the second RAT, the V2X service identifier may exist in both the sixth V2X service information and the seventh V2X service information.

In an implementation, the first terminal device may send an SUI message to the access network device, where the SUI message includes seventh V2X service information.

In a specific implementation, the V2X layer of the first terminal device may obtain at least one V2X service identifier that the first terminal device is interested in, and then determine a RAT of a V2X SL corresponding to each V2X service identifier. If the RAT of the V2X SL corresponding to each V2X service identifier is the second RAT, the V2X layer of the first terminal device may obtain, based on at least one piece of second frequency information corresponding to any V2X service identifier, a second frequency indication information list corresponding to the V2X service identifier. The V2X layer of the first terminal device may generate the seventh V2X service information based on the at least one V2X service identifier and the second frequency indication information list corresponding to each V2X service identifier. The V2X layer of the first terminal device may generate the SUI message including the seventh V2X service information, and the first terminal device sends the SUI message to the access network device.

Step S602: The first terminal device sends a UAI message to the access network device, where the UAI message carries a destination V2X service identifier and a service model corresponding to the destination V2X service identifier.

In this embodiment of this application, before sending a V2X service to the second terminal device, the first terminal device may obtain a destination V2X service identifier corresponding to the V2X service, and generate a UAI message including the destination V2X service identifier and a service model corresponding to the destination V2X service identifier. Then, the first terminal device sends the UAI message to the access network device.

In an implementation, if the destination V2X service identifier exists in the sixth V2X service information and the seventh V2X service information, and the first terminal device requests an NR V2X SL resource, the first terminal device may generate destination RAT indication information, where the destination RAT indication information is used to indicate the first RAT, then the first terminal device may generate a UAI message that includes the destination V2X service identifier, the corresponding service model, and the destination RAT indication information, and send the UAI message to the access network device. If the destination V2X service identifier exists in the sixth V2X service information and the seventh V2X service information, and the first terminal device requests an LTE V2X SL resource, the first terminal device may generate destination RAT indication information, where the destination RAT indication information is used to indicate the second RAT, then the first terminal device may generate a UAI message that includes the destination V2X service identifier, the corresponding service model, and the destination RAT indication information, and send the UAI message to the access network device.

In an implementation, if the destination V2X service identifier exists in the sixth V2X service information and the seventh V2X service information, and the first terminal device requests an NR V2X SL resource and an LTE V2X SL resource, the first terminal device may generate a UAI message that includes the destination V2X service identifier and the service model corresponding to the destination V2X service identifier, and send the UAI message to the access network device. Optionally, two sets of QoS parameters corresponding to the destination V2X service identifier are further included. One set corresponds to the first RAT, and the other set corresponds to the second RAT.

In an implementation, if the destination V2X service identifier exists in the sixth V2X service information or the seventh V2X service information, the first terminal device may directly generate a UAI message that includes the destination V2X service identifier and the service model corresponding to the destination V2X service identifier, and send the UAI message to the access network device.

Step S603: The access network device generates resource indication information based on the destination V2X service identifier and the service model corresponding to the destination V2X service identifier, where the resource indication information is a time-frequency resource used to indicate an SL, the time-frequency resource corresponds to a RAT, and the RAT includes the first RAT and/or the second RAT.

After receiving the UAI message, the access network device may search the sixth V2X service information and the seventh V2X service information for a frequency indication information list corresponding to the destination V2X service identifier. If the frequency indication information list is the first frequency indication information list, the access network device may determine that the first terminal device requests the NR V2X SL resource, and then determine a time-frequency resource based on at least one piece of first frequency indication information and the service model that correspond to the destination V2X service identifier. Then, the first access network device may generate the resource indication information based on the determined time-frequency resource used to indicate an NR V2X SL.

If the frequency indication information list is the second frequency indication information list, the access network device may determine that the first terminal device requests the LTE V2X SL resource, and then determine a time-frequency resource based on at least one piece of second frequency indication information and the service model that correspond to the destination V2X service identifier. Then, the first access network device may generate the resource indication information based on the determined time-frequency resource used to indicate an LTE V2X SL.

If the frequency indication information list is the first frequency indication information list and the second frequency indication information list, the access network device may determine, based on at least one piece of first frequency indication information and the service model that correspond to the destination V2X service identifier, a time-frequency resource used to indicate an NR V2X SL, and determine, based on at least one piece of second frequency indication information and the service model that correspond to the destination V2X service identifier, a time-frequency resource used to indicate an LTE V2X SL. Then, the first access network device may generate the resource indication information based on the time-frequency resource used to indicate the NR V2X SL and the time-frequency resource used to indicate the LTE V2X SL.

In an implementation, if the UAI message carries the destination RAT indication information, the access network device may determine, based on the destination RAT indication information, whether the first terminal device requests the NR V2X SL resource or the LTE V2X SL resource. If the destination RAT indication information is used to indicate the first RAT, the access network device may determine, based on the at least one piece of first frequency indication information and the service model that correspond to the destination V2X service identifier, the time-frequency resource used to indicate the NR V2X SL, and generate the resource indication information based on the time-frequency resource used to indicate the NR V2X SL. If the destination RAT indication information is used to indicate the second RAT, the access network device may determine, based on the at least one piece of second frequency indication information and the service model that correspond to the destination V2X service identifier, the time-frequency resource used to indicate the LTE V2X SL, and generate the resource indication information based on the time-frequency resource used to indicate the LTE V2X SL.

Step S604: The access network device sends the resource indication information to the first terminal device.

Step S605: The first terminal device sends a V2X service corresponding to the destination V2X service identifier to the second terminal device by using the time-frequency resource.

In the method described in FIG. 6, the first terminal device sends the SUI message to the access network device, where the SUI message includes the sixth V2X service information, the sixth V2X service information includes the fourth V2X service identifier list, and each entry in the fourth V2X service identifier list includes one V2X service identifier and at least one piece of first frequency indication information corresponding to the V2X service identifier. On this basis, after the first terminal device sends the UAI message to the access network device, the access network device may determine, based on the destination V2X service identifier and the sixth V2X service information that are carried in the UAI message, the RAT indication that corresponds to the destination V2X service identifier and that is reported by the first terminal device, and configure or schedule the SL resource of the corresponding RAT for the first terminal device.

Figure 7:
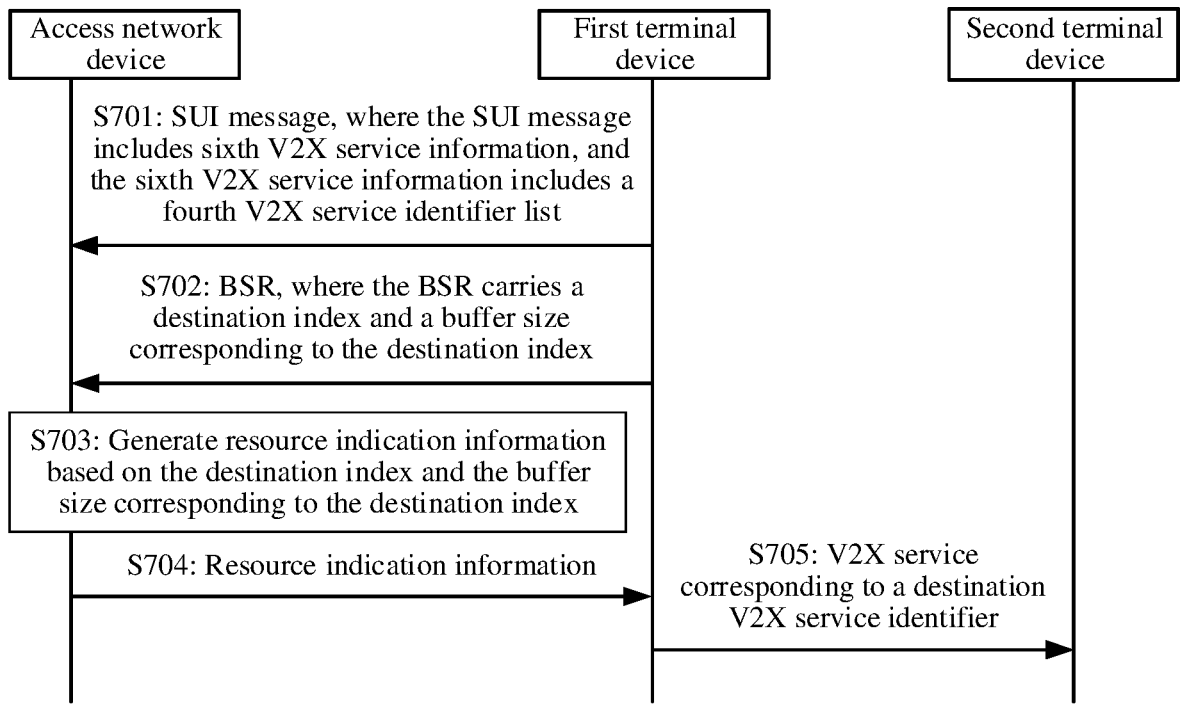
FIG. 7 is another schematic flowchart of a resource allocation method according to an embodiment of this application.

Based on the communication system shown in FIG. 1, FIG. 7 is another resource allocation method according to an embodiment of this application. The method includes but is not limited to the following steps.

Step S701: The first terminal device sends an SUI message to the access network device, where the SUI message includes sixth V2X service information, the sixth V2X service information includes a fourth V2X service identifier list, and each entry in the fourth V2X service identifier list includes one V2X service identifier and a first frequency indication information list corresponding to the V2X service identifier.

For step S701 in this embodiment of this application, refer to the specific description of step S6*oi* in the foregoing embodiment. Details are not described again in this embodiment of this application.

Step S702: The first terminal device sends a BSR to the access network device, where the BSR carries a destination index and a buffer size corresponding to the destination index.

In this embodiment of this application, before sending a V2X service to the second terminal device, the first terminal device may obtain a destination V2X service identifier corresponding to the V2X service and a RAT required for the V2X service, determine a destination index based on the destination V2X service identifier and the RAT corresponding to the destination V2X service identifier, generate a BSR including the destination index and a buffer size corresponding to the destination index, and then send the BSR to the access network device.

In an implementation, if the access network device does not support inter-RAT SL flexible scheduling, that is, the access network device can schedule an NR V2X SL resource only by using DCI, first V2X service information may be the sixth V2X service information, that is, the destination index carried in the BSR is used to indicate a location of a destination V2X service identifier in the sixth V2X service information.

In an implementation, if the access network device supports inter-RAT SL flexible scheduling, that is, the access network device can schedule an NR V2X SL resource and an LTE V2X SL resource by using DCI, the BSR may further carry destination RAT indication information corresponding to the destination index. In this case, the destination index indicates a location of the destination V2X service identifier in a V2X service identifier list corresponding to a RAT. It may be understood that in this case, the V2X service identifier list in the sixth V2X service information and a V2X service identifier list in seventh V2X service information are separately numbered.

In this embodiment, if the first terminal device requests an NR V2X SL resource, there is one destination index, second RAT indication information corresponding to the destination index is used to indicate a first RAT, and the destination index is used to indicate a location of the destination V2X service identifier in the sixth V2X service information. If the first terminal device requests an LTE V2X SL resource, there is one destination index, second RAT indication information corresponding to the destination index is used to indicate a second RAT, and the destination index is used to indicate a location of the destination V2X service identifier in the seventh V2X service information.

If the first terminal device requests an NR V2X SL resource and an LTE V2X SL resource, there are two destination indexes, second RAT indication information corresponding to one destination index is used to indicate a first RAT, and the destination index is used to indicate a location of the destination V2X service identifier in the sixth V2X service information; second RAT indication information corresponding to the other destination index is used to indicate a second RAT, and the destination index is used to indicate a location of the destination V2X service identifier in the seventh V2X service information.

In an implementation, if the access network device supports inter-RAT SL flexible scheduling, that is, the access network device can schedule an NR V2X SL resource and an LTE V2X SL resource by using DCI, first V2X service information may be eighth V2X service information, to be specific, the destination index carried in the BSR is used to indicate a location of the destination V2X service identifier in the eighth V2X service information, where the eighth V2X service information includes the fourth V2X service identifier list and a fifth V2X service identifier list, and the fourth V2X service identifier list is located before or after the fifth V2X service identifier list.

TABLE 8

| Eighth V2X service information | | |
|---|---|---|
| Fourth V2X service identifier list | Destination ID 1 | First frequency indication information list 1 |
| | Destination ID 3 | First frequency indication information list 2 |
| Fifth V2X service identifier list | Destination ID 1 | Second frequency indication information list 1 |
| | Destination ID 2 | Second frequency indication information list 2 |

The eighth V2X service information shown in Table 8 is used as an example. The fourth V2X service identifier list is located before the fifth V2X service identifier list.

In this embodiment, if the first terminal device requests an NR V2X SL resource or an LTE V2X SL resource, there is one destination index. If the first terminal device requests an NR V2X SL resource and an LTE V2X SL resource, there are two destination indexes. In an implementation, the two destination indexes respectively correspond to the fourth V2X service identifier list and the fifth V2X service identifier list. In this case, an additional RAT indication is required. In another implementation, the two destination indexes correspond to one V2X service identifier list, and the V2X service identifier list includes the fourth V2X service identifier list and the fifth V2X service identifier list.

Step S703: The access network device generates resource indication information based on the destination index and the buffer size corresponding to the destination index, where the resource indication information is a time-frequency resource used to indicate an SL, the time-frequency resource corresponds to a RAT, and the RAT includes the first RAT and/or the second RAT.

Table 6 and Table 7 are used as examples. Assuming that the destination RAT indication information corresponding to the destination index is used to indicate the first RAT and the destination index is 1, the access network device may determine that the first terminal device requests an NR V2X SL resource, determine, based on the first frequency indication information list 1 and a buffer size that correspond to the destination ID 1, a time-frequency resource used to indicate an NR V2X SL, and generate the resource indication information based on the time-frequency resource used to indicate the NR V2X SL. Assuming that the destination RAT indication information corresponding to the destination index is used to indicate the second RAT and the destination index is 1, the access network device may determine that the first terminal device requests an LTE V2X SL resource, determine, based on the second frequency indication information list 1 and a buffer size that correspond to the destination ID 1, a time-frequency resource used to indicate an LTE V2X SL, and generate the resource indication information based on the time-frequency resource used to indicate the LTE V2X SL. Assuming that destination RAT indication information corresponding to a destination index is used to indicate the first RAT and the destination index is 1, and destination RAT indication information corresponding to another destination index is used to indicate the second RAT and the destination index is 1, the access network device may determine that the first terminal device requests an NR V2X SL resource and an LTE V2X SL resource, determine, based on the first frequency indication information list 1 and a buffer size that correspond to the destination ID 1, a time-frequency resource used to indicate an NR V2X SL, determine, based on the second frequency indication information list 1 and the buffer size that correspond to the destination ID 1, a time-frequency resource used to indicate an LTE V2X SL, and then generate the resource indication information based on the time-frequency resource used to indicate the LTE V2X SL and the time-frequency resource used to indicate the NR V2X SL.

Table 8 is used as an example. Assuming that the destination index is 1, the access network device may determine that the first terminal device requests an NR V2X SL resource, determine, based on the first frequency indication information list 1 and a buffer size that correspond to the destination ID 1, a time-frequency resource used to indicate an NR V2X SL, and generate the resource indication information based on the time-frequency resource used to indicate the NR V2X SL. Assuming that the destination index is 3, the access network device may determine that the first terminal device requests an LTE V2X SL resource, determine, based on the second frequency indication information list 1 and a buffer size that correspond to the destination ID 1, a time-frequency resource used to indicate an LTE V2X SL, and generate the resource indication information based on the time-frequency resource used to indicate the LTE V2X SL. Assuming that destination indexes are 1 and 3, the access network device may determine that the first terminal device requests an NR V2X SL resource and an LTE V2X SL resource, determine, based on the first frequency indication information list 1 and a buffer size that correspond to the destination ID 1, a time-frequency resource used to indicate an NR V2X SL, determine, based on the second frequency indication information list 1 and the buffer size that correspond to the destination ID 1, a time-frequency resource used to indicate an LTE V2X SL, and then generate the resource indication information based on the time-frequency resource used to indicate the LTE V2X SL and the time-frequency resource used to indicate the NR V2X SL.

Step S704: The access network device sends the resource indication information to the first terminal device.

Step S705: The first terminal device sends a V2X service corresponding to the destination V2X service identifier to the second terminal device by using the time-frequency resource.

In the method described in FIG. 7, the first terminal device sends the SUI message to the access network device, where the SUI message includes the sixth V2X service information, the sixth V2X service information includes the fourth V2X service identifier list, and each entry in the fourth V2X service identifier list includes one V2X service identifier and at least one piece of first frequency indication information corresponding to the V2X service identifier. On this basis, after the first terminal device sends the BSR to the access network device, the access network device may determine, based on the sixth V2X service information and the destination index that is carried in the BSR, the RAT indication that corresponds to the destination V2X service identifier and that is reported by the first terminal device, and configure or schedule the SL resource of the corresponding RAT for the first terminal device.

Figure 8:
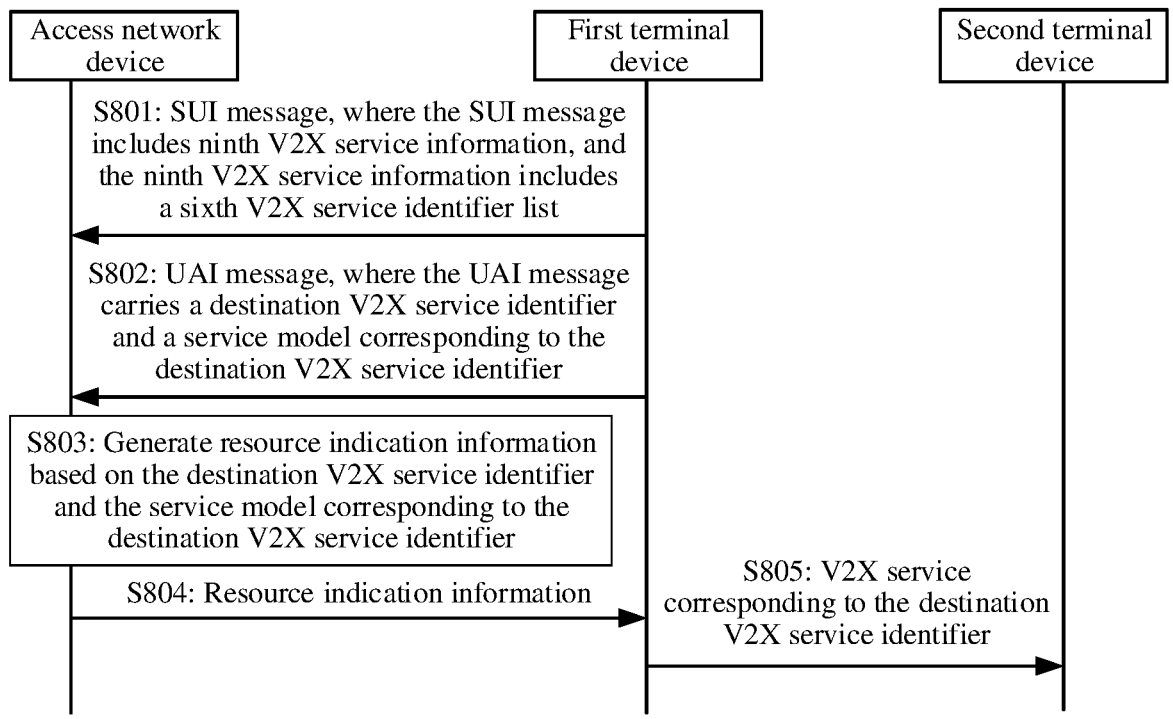
FIG. 8 is another schematic flowchart of a resource allocation method according to an embodiment of this application.

Based on the communication system shown in FIG. 1, FIG. 8 is another resource allocation method according to an embodiment of this application. The method includes but is not limited to the following steps.

Step S801: The first terminal device sends an SUI message to the access network device, where the SUI message includes ninth V2X service information, the ninth V2X service information includes a sixth V2X service identifier list, each entry in the sixth V2X service identifier list includes one V2X service identifier and at least one piece of frequency indication information and second RAT indication information that correspond to the V2X service identifier, where the second RAT indication information is used to indicate a first RAT or a second RAT, and the at least one piece of frequency indication information is at least one piece of first frequency indication information or at least one piece of second frequency indication information.

In an implementation, at least two same V2X service identifiers may exist in the sixth V2X service identifier list.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to a V2X service identifier is the first RAT, the V2X layer of the first terminal device may obtain, based on at least one piece of first frequency information corresponding to the V2X service identifier, a first frequency indication information list corresponding to the V2X service identifier, where second RAT indication information corresponding to the V2X service identifier is used to indicate the first RAT. If a RAT of a V2X SL corresponding to another V2X service identifier is the second RAT, the V2X layer of the first terminal device may obtain, based on at least one piece of second frequency information corresponding to the V2X service identifier, a second frequency indication information list corresponding to the V2X service identifier, where second RAT indication information corresponding to the V2X service identifier is used to indicate the second RAT. If RATs of V2X SLs corresponding to another V2X service identifier are the first RAT and the second RAT, the V2X layer of the first terminal device may obtain, based on at least one piece of first frequency information corresponding to the V2X service identifier, a first frequency indication information list corresponding to the V2X service identifier, where second RAT indication information corresponding to the V2X service identifier is used to indicate the first RAT; and obtain, based on at least one piece of second frequency information corresponding to the V2X service identifier, a second frequency indication information list corresponding to the V2X service identifier, where the second RAT indication information corresponding to the V2X service identifier is used to indicate the second RAT, and the V2X service identifier appears twice in the sixth V2X service identifier list.

TABLE 9

Ninth V2X service information
Sixth V2X service identifier list

| Destination ID 1 | Frequency indication information list 1 | Second RAT indication information 1 |
| Destination ID 1 | Frequency indication information list 2 | Second RAT indication information 2 |
| Destination ID 2 | Frequency indication information list 3 | Second RAT indication information 3 |

The ninth V2X service information shown in Table 9 is used as an example. A destination ID is used to represent a V2X service identifier. The V2X layer of the first terminal device determines that RATs of V2X SLs corresponding to the destination ID 1 are the first RAT and the second RAT. The V2X layer of the first terminal device may obtain at least one piece of first frequency indication information corresponding to the destination ID 1, the frequency indication information list 1 includes the at least one piece of first frequency indication information corresponding to the destination ID 1, and the first entry in the sixth V2X service identifier list includes the destination ID 1 and the frequency indication information list 1 and the second RAT indication information 1 that correspond to the destination ID 1, where the second RAT indication information 1 is used to indicate the first RAT. The V2X layer of the first terminal device may further obtain at least one piece of second frequency indication information corresponding to the destination ID 1, the frequency indication information list 2 includes the at least one piece of second frequency indication information corresponding to the destination ID 1, and the second entry in the sixth V2X service identifier list includes the destination ID 1 and the frequency indication information list 2 and the second RAT indication information 2 that correspond to the destination ID 1, where the second RAT indication information 2 is used to indicate the second RAT. The V2X layer of the first terminal device determines that a RAT of a V2X SL corresponding to the destination ID 2 is the first RAT. The V2X layer of the first terminal device may obtain at least one piece of first frequency indication information corresponding to the destination ID 2, the frequency indication information list 3 includes the at least one piece of first frequency indication information corresponding to the destination ID 2, and the third entry in the sixth V2X service identifier list includes the destination ID 2 and the frequency indication information list 3 and the second RAT indication information 3 that correspond to the destination ID 2, where the second RAT indication information 3 is used to indicate the first RAT.

Step S802: The first terminal device sends a UAI message to the access network device, where the UAI message carries a destination V2X service identifier and a service model corresponding to the destination V2X service identifier.

In this embodiment of this application, before sending a V2X service to the second terminal device, the first terminal device may obtain a destination V2X service identifier corresponding to the V2X service, and generate a UAI message including the destination V2X service identifier and a service model corresponding to the destination V2X service identifier. Then, the first terminal device sends the UAI message to the access network device.

In an implementation, if there are two destination V2X service identifiers in the ninth V2X service information, and the first terminal device requests an NR V2X SL resource, the first terminal device may generate destination RAT indication information, where the destination RAT indication information is used to indicate the first RAT, then the first terminal device may generate a UAI message that includes the destination V2X service identifier, a corresponding service model, and the destination RAT indication information, and send the UAI message to the access network device. If there are two destination V2X service identifiers in the ninth V2X service information, and the first terminal device requests an LTE V2X SL resource, the first terminal device may generate destination RAT indication information, where the destination RAT indication information is used to indicate the second RAT, then the first terminal device may generate a UAI message that includes the destination V2X service identifier, a corresponding service model, and the destination RAT indication information, and send the UAI message to the access network device.

In an implementation, if there are two destination V2X service identifiers in the ninth V2X service information, and the first terminal device requests an NR V2X SL resource and an LTE V2X SL resource, the first terminal device may generate a UAI message that includes the destination V2X service identifiers and service models corresponding to the destination V2X service identifiers, and send the UAI message to the access network device.

In an implementation, if there is one destination V2X service identifier in the ninth V2X service information, the first terminal device may directly generate a UAI message that includes the destination V2X service identifier and a service model corresponding to the destination V2X service identifier, and send the UAI message to the access network device.

Step S803: The access network device generates resource indication information based on the destination V2X service identifier and the service model corresponding to the destination V2X service identifier, where the resource indication information is a time-frequency resource used to indicate an SL, the time-frequency resource corresponds to a RAT, and the RAT includes the first RAT and/or the second RAT.

After receiving the UAI message, the access network device may search the ninth V2X service information for destination RAT indication information corresponding to the destination V2X service identifier. If the destination RAT indication information is used to indicate the first RAT, the access network device may determine that the first terminal device requests the NR V2X SL resource, and then determine a time-frequency resource based on at least one piece of frequency indication information and the service model that correspond to the destination V2X service identifier. Then, the first access network device may generate the resource indication information based on the determined time-frequency resource used to indicate an NR V2X SL.

If the destination RAT indication information is used to indicate the second RAT, the access network device may determine that the first terminal device requests the LTE V2X SL resource, and then determine a time-frequency resource based on at least one piece of frequency indication information and the service model that correspond to the destination V2X service identifier. Then, the first access network device may generate the resource indication information based on the determined time-frequency resource used to indicate an LTE V2X SL.

If there are two destination V2X service identifiers in the ninth V2X service information, and a destination V2X service identifier in an entry in the sixth V2X service identifier list corresponds to the destination RAT indication information used to indicate the first RAT, the access network device may determine, based on at least one piece of frequency indication information and a service model that correspond to the destination V2X service identifier, a time-frequency resource used to indicate an NR V2X SL. If a destination V2X service identifier in another entry in the sixth V2X service identifier list corresponds to the destination RAT indication information used to indicate the second RAT, the access network device may determine, based on at least one piece of frequency indication information and a service model that correspond to the destination V2X service identifier, a time-frequency resource used to indicate an LTE V2X SL. Then, the first access network device may generate the resource indication information based on the time-frequency resource used to indicate the NR V2X SL and the time-frequency resource used to indicate the LTE V2X SL.

In an implementation, if the UAI message carries the destination RAT indication information, the access network device may determine, based on the destination RAT indication information, whether the first terminal device requests the NR V2X SL resource or the LTE V2X SL resource. If the destination RAT indication information is used to indicate the first RAT, the access network device may search the sixth V2X service identifier list for a destination V2X service identifier corresponding to the destination RAT indication information used to indicate the first RAT, determine, based on at least one piece of frequency indication information and a service model that correspond to the destination V2X service identifier, a time-frequency resource used to indicate an NR V2X SL, and generate the resource indication information based on the time-frequency resource used to indicate the NR V2X SL. If the destination RAT indication information is used to indicate the second RAT, the access network device may search the sixth V2X service identifier list for a destination V2X service identifier corresponding to the destination RAT indication information used to indicate the second RAT, determine, based on at least one piece of frequency indication information and a service model that correspond to the destination V2X service identifier, a time-frequency resource used to indicate an LTE V2X SL, and generate the resource indication information based on the time-frequency resource used to indicate the LTE V2X SL.

Step S804: The access network device sends the resource indication information to the first terminal device.

Step S805: The first terminal device sends a V2X service corresponding to the destination V2X service identifier to the second terminal device by using the time-frequency resource.

In the method described in FIG. 8, the first terminal device sends the SUI message to the access network device, where the SUI message includes the ninth V2X service information, the ninth V2X service information includes the sixth V2X service identifier list, and each entry in the sixth V2X service identifier list includes one V2X service identifier and at least one piece of frequency indication information and the second RAT indication information that correspond to the V2X service identifier. On this basis, after the first terminal device sends the UAI message to the access network device, the access network device may determine, based on the destination RAT indication information, the RAT indication that corresponds to the destination V2X service identifier and that is reported by the first terminal device, and configure or schedule the SL resource of the corresponding RAT for the first terminal device.

Figure 9:
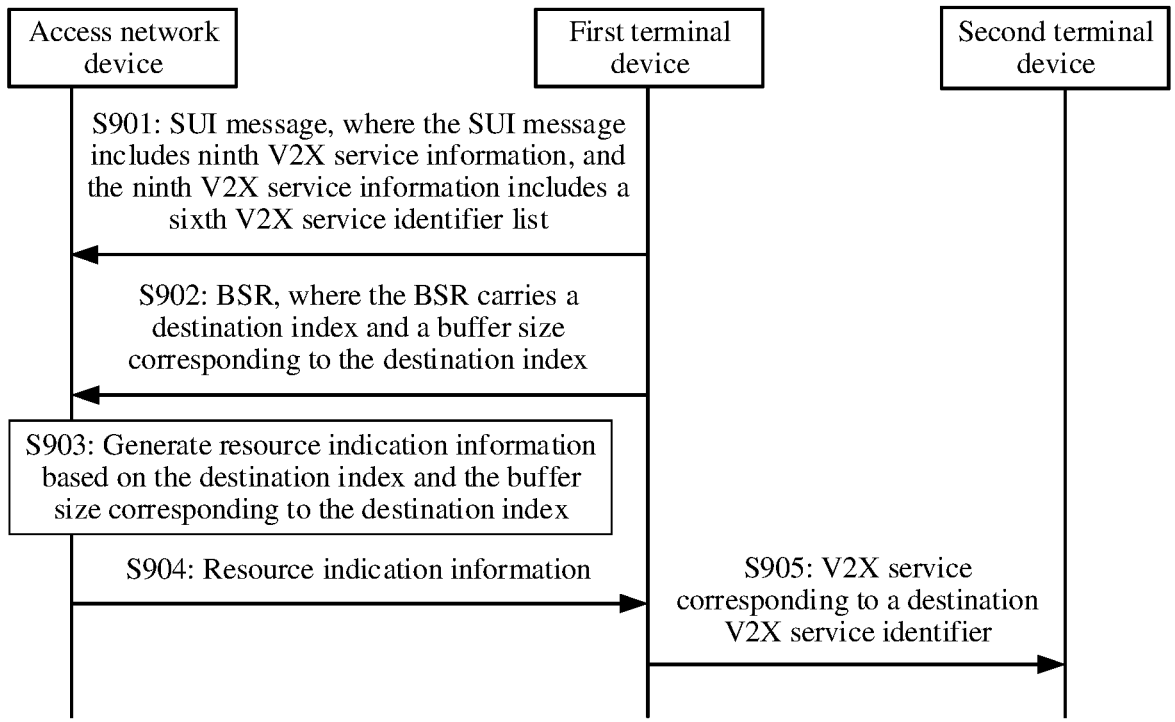
FIG. 9 is another schematic flowchart of a resource allocation method according to an embodiment of this application.

Based on the communication system shown in FIG. 1, FIG. 9 is another resource allocation method according to an embodiment of this application. The method includes but is not limited to the following steps.

Step S901: The first terminal device sends an SUI message to the access network device, where the SUI message includes ninth V2X service information, the ninth V2X service information includes a sixth V2X service identifier list, each entry in the sixth V2X service identifier list includes one V2X service identifier and at least one piece of frequency indication information and second RAT indication information that correspond to the V2X service identifier, where the second RAT indication information is used to indicate a first RAT or a second RAT.

For step S901 in this embodiment of this application, refer to the specific description of step S801 in the foregoing embodiment. Details are not described again in this embodiment of this application.

Step S902: The first terminal device sends a BSR to the access network device, where the BSR carries a destination index and a buffer size corresponding to the destination index.

In this embodiment of this application, before sending a V2X service to the second terminal device, the first terminal device may obtain a destination V2X service identifier corresponding to the V2X service and a RAT required for the V2X service, determine a destination index based on the destination V2X service identifier and the RAT corresponding to the destination V2X service identifier, generate a BSR including the destination index and a buffer size corresponding to the destination index, and then send the BSR to the access network device. First V2X service information may be the ninth V2X service information, to be specific, the destination index is used to indicate a location of a destination V2X service identifier in the ninth V2X service information.

In this embodiment, if the first terminal device requests an NR V2X SL resource or an LTE V2X SL resource, there is one destination index. If the first terminal device requests an NR V2X SL resource and an LTE V2X SL resource, there are two destination indexes.

Step S903: The access network device generates resource indication information based on the destination index and the buffer size corresponding to the destination index.

Table 9 is used as an example. Assuming that the destination index is 1, and the second RAT indication information in the first entry is used to indicate the first RAT, the access network device may determine that the first terminal device requests an NR V2X SL resource, determine, based on the frequency indication information list 1 and a buffer size that correspond to the destination ID 1, a time-frequency resource used to indicate an NR V2X SL, and generate the resource indication information based on the time-frequency resource used to indicate the NR V2X SL. Assuming that the destination index is 2, and the second RAT indication information in the second entry is used to indicate the second RAT, the access network device may determine that the first terminal device requests an LTE V2X SL resource, determine, based on the frequency indication information list 2 and a buffer size that correspond to the destination ID 1, a time-frequency resource used to indicate an LTE V2X SL, and generate the resource indication information based on the time-frequency resource used to indicate the LTE V2X SL. Assuming that destination indexes are 1 and 2, the access network device may determine that the first terminal device requests an NR V2X SL resource and an LTE V2X SL resource, determine, based on the frequency indication information list 1 and a buffer size that correspond to the destination ID 1, a time-frequency resource used to indicate an NR V2X SL, determine, based on the frequency indication information list 2 and the buffer size that correspond to the destination ID 1, a time-frequency resource used to indicate an LTE V2X SL, and then generate the resource indication information based on the time-frequency resource used to indicate the LTE V2X SL and the time-frequency resource used to indicate the NR V2X SL.

Step S904: The access network device sends the resource indication information to the first terminal device.

Step S905: The first terminal device sends a V2X service corresponding to the destination V2X service identifier to the second terminal device by using the time-frequency resource.

In the method described in FIG. 9, the first terminal device sends the SUI message to the access network device, where the SUI message includes the ninth V2X service information, the ninth V2X service information includes the sixth V2X service identifier list, and each entry in the sixth V2X service identifier list includes one V2X service identifier and at least one piece of frequency indication information and the second RAT indication information that correspond to the V2X service identifier. On this basis, after the first terminal device sends the BSR to the access network device, the access network device may determine, based on the ninth V2X service information and the destination index that is carried in the BSR, the RAT indication that corresponds to the destination V2X service identifier and that is reported by the first terminal device, and configure or schedule the SL resource of the corresponding RAT for the first terminal device.

An embodiment of this application provides another resource allocation method. A difference between the method and the solution in FIG. 8 is that the second RAT indication information in this embodiment of this application may indicate the first RAT, the second RAT, or the first RAT and the second RAT. In addition, the access network device sends a third frequency information list to the first terminal device. However, the second RAT indication information in the solution in FIG. 8 may indicate only the first RAT or the second RAT, and the access network device sends the first frequency information list and the second frequency information list to the first terminal device. The method includes but is not limited to the following steps.

Step S1001: The first terminal device sends an SUI message to the access network device, where the SUI message includes ninth V2X service information, the ninth V2X service information includes a sixth V2X service identifier list, each entry in the sixth V2X service identifier list includes one V2X service identifier and at least one piece of frequency indication information and the second RAT indication information that correspond to the V2X service identifier, where the second RAT indication information is used to indicate the first RAT and/or the second RAT.

In an implementation, before the first terminal device sends the SUI message to the access network device, the access network device may send the third frequency information list to the first terminal device, where the third frequency information list may include at least one piece of first frequency information and at least one piece of second frequency information, and the at least one piece of first frequency information is located before or after the at least one piece of second frequency information.

In an implementation, before the first terminal device sends the SUI message to the access network device, the access network device may send the first frequency information list and the second frequency information list to the first terminal device. The first terminal device may obtain the third frequency information list based on the first frequency information list and the second frequency information list, where the third frequency information list includes the first frequency information list and the second frequency information list, and the first frequency information list is located before or after the second frequency information list.

In an implementation, V2X service identifiers in the sixth V2X service identifier list are different.

In a specific implementation, the V2X layer of the first terminal device may obtain at least one V2X service identifier that the first terminal device is interested in, and then determine a RAT of a V2X SL corresponding to each V2X service identifier. If a RAT of a V2X SL corresponding to a V2X service identifier is the first RAT, the V2X layer of the first terminal device may obtain, based on at least one piece of first frequency information corresponding to the V2X service identifier, a first frequency indication information list corresponding to the V2X service identifier, where second RAT indication information corresponding to the V2X service identifier is used to indicate the first RAT, and first frequency indication information may be a third frequency index and is used to indicate a location of the first frequency information in the third frequency information list.

If a RAT of a V2X SL corresponding to another V2X service identifier is the second RAT, the V2X layer of the first terminal device may obtain, based on at least one piece of second frequency information corresponding to the V2X service identifier, a second frequency indication information list corresponding to the V2X service identifier, where second RAT indication information corresponding to the V2X service identifier is used to indicate the second RAT, and second frequency indication information may be a fourth frequency index and is used to indicate a location of the second frequency information in the third frequency information list.

If RATs of V2X SLs corresponding to another V2X service identifier are the first RAT and the second RAT, the V2X layer of the first terminal device may obtain, based on at least one piece of first frequency information corresponding to the V2X service identifier, a first frequency indication information list corresponding to the V2X service identifier, and obtain, based on at least one piece of second frequency information corresponding to the V2X service identifier, a second frequency indication information list corresponding to the V2X service identifier, where first frequency indication information is a third frequency index, and second frequency indication information is a fourth frequency index. Then, the V2X layer of the first terminal device may obtain a frequency indication information list corresponding to the V2X service identifier. The frequency indication information list includes the first frequency indication information list corresponding to the V2X service identifier and the second frequency indication information list corresponding to the V2X service identifier. Second RAT indication information corresponding to the V2X service identifier is used to indicate the first RAT and the second RAT.

TABLE 10

Ninth V2X service information
Sixth V2X service identifier list

| | | |
|---|---|---|
| Destination ID 1 | Frequency indication information list 1 | Second RAT indication information 1 |
| Destination ID 2 | Frequency indication information list 2 | Second RAT indication information 2 |

The ninth V2X service information shown in Table 10 is used as an example. A destination ID is used to represent a V2X service identifier. The V2X layer of the first terminal device determines that RATs of V2X SLs corresponding to the destination ID 1 are the first RAT and the second RAT. The V2X layer of the first terminal device may obtain at least one piece of first frequency indication information corresponding to the destination ID 1 and at least one piece of second frequency indication information corresponding to the destination ID 1, where the frequency indication information list 1 includes the at least one piece of first frequency indication information corresponding to the destination ID 1 and the at least one piece of second frequency indication information corresponding to the destination ID 1, the first entry in the sixth V2X service identifier list includes the destination ID 1 and the frequency indication information list 1 and the second RAT indication information 1 that correspond to the destination ID 1, where the second RAT indication information 1 is used to indicate the first RAT and the second RAT. The V2X layer of the first terminal device determines that a RAT of a V2X SL corresponding to the destination ID 2 is the first RAT. The V2X layer of the first terminal device may obtain at least one piece of first frequency indication information corresponding to the destination ID 2, the frequency indication information list 2 includes the at least one piece of first frequency indication information corresponding to the destination ID 2, and the second entry in the sixth V2X service identifier list includes the destination ID 2 and the frequency indication information list 2 and the second RAT indication information 2 that correspond to the destination ID 2, where the second RAT indication information 2 is used to indicate the first RAT.

Step S1002: The first terminal device sends a UAI message to the access network device, where the UAI message carries a destination V2X service identifier and a service model corresponding to the destination V2X service identifier.

In this embodiment of this application, before sending a V2X service to the second terminal device, the first terminal device may obtain a destination V2X service identifier corresponding to the V2X service, and generate a UAI message including the destination V2X service identifier and a service model corresponding to the destination V2X service identifier. Then, the first terminal device sends the UAI message to the access network device.

In an implementation, if second RAT indication information corresponding to the destination V2X service identifier is used to indicate the first RAT and the second RAT, and the first terminal device requests an NR V2X SL resource, the first terminal device may generate destination RAT indication information, where the destination RAT indication information is used to indicate the first RAT, then the first terminal device may generate a UAI message that includes the destination V2X service identifier, the corresponding service model, and the destination RAT indication information, and send the UAI message to the access network device. If second RAT indication information corresponding to the destination V2X service identifier is used to indicate the first RAT and the second RAT, and the first terminal device requests an LTE V2X SL resource, the first terminal device may generate destination RAT indication information, where the destination RAT indication information is used to indicate the second RAT, then the first terminal device may generate a UAI message that includes the destination V2X service identifier, the corresponding service model, and the destination RAT indication information, and send the UAI message to the access network device.

In an implementation, if second RAT indication information corresponding to the destination V2X service identifier is used to indicate the first RAT and the second RAT, and the first terminal device requests an NR V2X SL resource and an LTE V2X SL resource, the first terminal device may generate a UAI message that includes the destination V2X service identifier and the service model corresponding to the destination V2X service identifier, and send the UAI message to the access network device.

In an implementation, if second RAT indication information corresponding to the destination V2X service identifier is used to indicate the first RAT or the second RAT, the first terminal device may directly generate a UAI message that includes the destination V2X service identifier and the service model corresponding to the destination V2X service identifier, and send the UAI message to the access network device.

Step S1003: The access network device generates resource indication information based on the destination V2X service identifier and the service model corresponding to the destination V2X service identifier, where the resource indication information is a time-frequency resource used to indicate an SL, the time-frequency resource corresponds to a RAT, and the RAT includes the first RAT and/or the second RAT.

After receiving the UAI message, the access network device may search the ninth V2X service information for the destination RAT indication information corresponding to the destination V2X service identifier. If the destination RAT indication information is used to indicate the first RAT, the access network device may determine that the first terminal device requests the NR V2X SL resource, and then determine a time-frequency resource based on at least one piece of frequency indication information and the service model that correspond to the destination V2X service identifier. Then, the first access network device may generate the resource indication information based on the determined time-frequency resource used to indicate an NR V2X SL.

If the destination RAT indication information is used to indicate the second RAT, the access network device may determine that the first terminal device requests the LTE V2X SL resource, and then determine the time-frequency resource based on at least one piece of frequency indication information and the service model that correspond to the destination V2X service identifier. Then, the first access network device may generate the resource indication information based on the determined time-frequency resource used to indicate an LTE V2X SL.

If the destination RAT indication information corresponding to the destination V2X service identifier is used to indicate the first RAT and the second RAT, the access network device may search, based on at least one piece of frequency indication information corresponding to the destination V2X service identifier, the third frequency information list for first frequency information indicated by the frequency indication information, determine, based on the found first frequency information and the service model, a time-frequency resource used to indicate an NR V2X SL, search, based on the at least one piece of frequency indication information corresponding to the destination V2X service identifier, the third frequency information list for second frequency information indicated by the frequency indication information, and determine, based on the second frequency information and the service model, a time-frequency resource used to indicate an LTE V2X SL. Then, the first access network device may generate the resource indication information based on the time-frequency resource used to indicate the NR V2X SL and the time-frequency resource used to indicate the LTE V2X SL.

In an implementation, if the UAI message carries the destination RAT indication information, the access network device may determine, based on the destination RAT indication information, whether the first terminal device requests the NR V2X SL resource or the LTE V2X SL resource. If the destination RAT indication information is used to indicate the first RAT, the access network device may search the sixth V2X service identifier list for first frequency indication information and the service model in the at least one piece of frequency indication information corresponding to the destination V2X service identifier, determine the time-frequency resource used to indicate the NR V2X SL, and generate the resource indication information based on the time-frequency resource used to indicate the NR V2X SL. If the destination RAT indication information is used to indicate the second RAT, the access network device may search the sixth V2X service identifier list for second frequency indication information and the service model in the at least one piece of frequency indication information corresponding to the destination V2X service identifier, determine the time-frequency resource used to indicate the LTE V2X SL, and generate the resource indication information based on the time-frequency resource used to indicate the LTE V2X SL.

Step S1004: The access network device sends the resource indication information to the first terminal device.

Step S1005: The first terminal device sends a V2X service corresponding to the destination V2X service identifier to the second terminal device by using the time-frequency resource.

In this embodiment, the first terminal device sends the SUI message to the access network device, where the SUI message includes the ninth V2X service information, the ninth V2X service information includes the sixth V2X service identifier list, and each entry in the sixth V2X service identifier list includes one V2X service identifier and at least one piece of frequency indication information and the second RAT indication information that correspond to the V2X service identifier. On this basis, after the first terminal device sends the UAI message to the access network device, the access network device may determine, based on the destination RAT indication information, the RAT indication that corresponds to the destination V2X service identifier and that is reported by the first terminal device, and configure or schedule the SL resource of the corresponding RAT for the first terminal device.

An embodiment of this application provides another resource allocation method. A difference between the method and the solution in FIG. 9 is that the second RAT indication information in this embodiment of this application may indicate the first RAT, the second RAT, or the first RAT and the second RAT. In addition, the access network device sends a third frequency information list to the first terminal device. However, the second RAT indication information in the solution in FIG. 9 may indicate only the first RAT or the second RAT, and the access network device sends the first frequency information list and the second frequency information list to the first terminal device. The method includes but is not limited to the following steps.

Step S1101: The first terminal device sends an SUI message to the access network device, where the SUI message includes ninth V2X service information, the ninth V2X service information includes a sixth V2X service identifier list, each entry in the sixth V2X service identifier list includes one V2X service identifier and at least one piece of frequency indication information and the second RAT indication information that correspond to the V2X service identifier, where the second RAT indication information is used to indicate the first RAT and/or the second RAT.

For step S1101 in this embodiment of this application, refer to the specific description of step S1001 in the foregoing embodiment. Details are not described again in this embodiment of this application.

Step S1102: The first terminal device sends a BSR to the access network device, where the BSR carries a destination index and a buffer size corresponding to the destination index.

In this embodiment of this application, before sending a V2X service to the second terminal device, the first terminal device may obtain a destination index corresponding to the V2X service, and generate a BSR including the destination index and a buffer size corresponding to the destination index. Then, the first terminal device sends the BSR to the access network device. First V2X service information may be the ninth V2X service information, to be specific, the destination index is used to indicate a location of the destination V2X service identifier in the ninth V2X service information.

In an implementation, if the access network device supports inter-RAT SL flexible scheduling, that is, the access network device can schedule an NR V2X SL resource and an LTE V2X SL resource by using DCI, the BSR may further carry destination RAT indication information corresponding to the destination index.

In this embodiment, if second RAT indication information corresponding to the destination V2X service identifier in the ninth V2X service information is used to indicate the first RAT and the second RAT, and the first terminal device requests the NR V2X SL resource, the first terminal device may generate a BSR including the destination index, the corresponding buffer size, and the destination RAT indication information, and send the BSR to the access network device, where the destination RAT indication information is used to indicate the first RAT. If second RAT indication information corresponding to the destination index in the ninth V2X service information is used to indicate the first RAT and the second RAT, and the first terminal device requests the LTE V2X SL resource, the first terminal device may generate a BSR including the destination index, the corresponding buffer size, and the destination RAT indication information, and send the BSR to the access network device, where the destination RAT indication information is used to indicate the second RAT.

Step S1103: The access network device generates resource indication information based on the destination index and the buffer size corresponding to the destination index.

Table 10 is used as an example. Assuming that the destination index is 1 and the second RAT indication information in the first entry is used to indicate the first RAT and the second RAT, the access network device may determine that the first terminal device requests an NR V2X SL resource and an LTE V2X SL resource, search the third frequency information list for first frequency information based on the frequency indication information list 1 corresponding to the destination ID 1, determine, based on the found first frequency information and a buffer size, a time-frequency resource used to indicate an NR V2X SL, search the third frequency information list for second frequency information based on the frequency indication information list 1 corresponding to the destination ID 1, determine, based on the found second frequency information and the buffer size, a time-frequency resource used to indicate an LTE V2X SL, and then generate the resource indication information based on the time-frequency resource used to indicate the LTE V2X SL and the time-frequency resource used to indicate the NR V2X SL.

In an implementation, if the BSR carries the destination RAT indication information, the access network device may determine, based on the destination RAT indication information, whether the first terminal device requests the NR V2X SL resource or the LTE V2X SL resource. If the destination RAT indication information is used to indicate the first RAT, the access network device may search the sixth V2X service identifier list for the destination V2X service identifier corresponding to the destination index, search the third frequency information list for the first frequency information based on frequency indication information corresponding to the destination V2X service identifier, determine, based on the found first frequency information and the buffer size, the time-frequency resource used to indicate the NR V2X SL, and generate the resource indication information based on the time-frequency resource used to indicate the NR V2X SL. If the destination RAT indication information is used to indicate the second RAT, the access network device may search the sixth V2X service identifier list for the destination V2X service identifier corresponding to the destination index, search the third frequency information list for the second frequency information based on at least one piece of frequency indication information corresponding to the destination V2X service identifier, determine, based on the found second frequency information and the buffer size, the time-frequency resource used to indicate the LTE V2X SL, and generate the resource indication information based on the time-frequency resource used to indicate the LTE V2X SL.

Step S1104: The access network device sends the resource indication information to the first terminal device.

Step S1105: The first terminal device sends a V2X service corresponding to the destination V2X service identifier to the second terminal device by using the time-frequency resource.

In this embodiment, the first terminal device sends the SUI message to the access network device, where the SUI message includes the ninth V2X service information, the ninth V2X service information includes the sixth V2X service identifier list, and each entry in the sixth V2X service identifier list includes one V2X service identifier and at least one piece of frequency indication information and the second RAT indication information that correspond to the V2X service identifier. On this basis, after the first terminal device sends the BSR to the access network device, the access network device may determine, based on the ninth V2X service information and the destination index that is carried in the BSR, the RAT indication that corresponds to the destination V2X service identifier and that is reported by the first terminal device, and configure or schedule the SL resource of the corresponding RAT for the first terminal device.

With reference to the foregoing content, an embodiment of this application provides another resource allocation method. The method includes but is not limited to the following solutions:

In V2X, each destination ID is obtained through mapping at the V2X layer. In this embodiment, the V2X layer of the first terminal device obtains, in consideration of a same V2X service type (service type), different destination IDs through mapping for different RATs, that is, a selected RAT is used as an influencing factor for obtaining the destination ID through mapping. In this case, the RAT may be the first RAT or the second RAT.

In an implementation, the V2X layer of the first terminal device may indicate that two destination IDs correspond to a same service type. For example, RATs of V2X SLs corresponding to a V2X service type are the first RAT and the second RAT, and the V2X layer of the first terminal device may obtain two V2X service identifiers through mapping for a V2X service corresponding to the V2X service type. Different V2X service identifiers correspond to different RATs.

Further, RATs of V2X SLs corresponding to a V2X service type are the first RAT and the second RAT. In this case, when the first terminal device sends the resource request information to the access network device, the destination V2X service indication information carried in the resource request information may indicate two V2X service identifiers.

In this embodiment, the V2X service identifier corresponds to the first RAT or the second RAT. This can avoid a complex processing procedure caused by a case in which the V2X service identifier corresponds to the first RAT and the second RAT.

The foregoing has described the method in the embodiments of this application in detail. The following provides a communication apparatus and a related device in the embodiments of this application.

Figure 10:
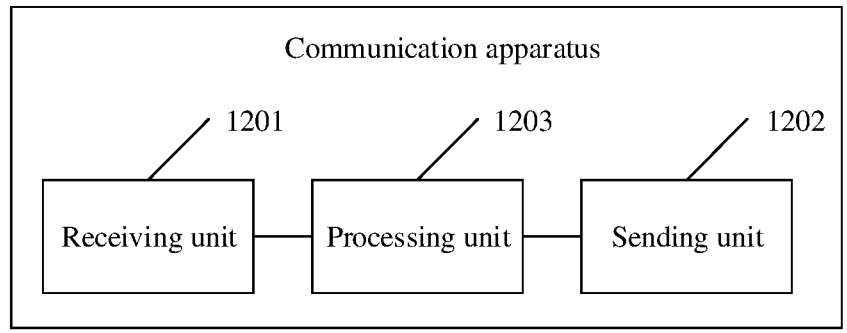
FIG. 10 is a schematic diagram of a structure of a communication apparatus according to an embodiment of this application.

FIG. 10 is a schematic diagram of a structure of a communication apparatus according to an embodiment of this application. The communication apparatus is configured to perform steps performed by the first terminal device in the method embodiments corresponding to FIG. 2 to FIG. 9 and the foregoing content. The communication apparatus may include: a receiving unit 1201, configured to receive a first frequency information list and a second frequency information list from an access network device, where the first frequency information list includes at least one piece of first frequency information, and the second frequency information list includes at least one piece of second frequency information; and a sending unit 1202, configured to send resource request information to the access network device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list, where the receiving unit 1201 is further configured to receive resource indication information from the access network device, where the resource indication information is a time-frequency resource that is determined by the access network device based on the destination V2X service indication information and that is used to indicate a sidelink SL; and the sending unit 1202 is further configured to send a V2X service to a second terminal device by using the time-frequency resource.

In an implementation, before sending the resource request information to the access network device, the sending unit 1202 may send a second message to the access network device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before sending the resource request information to the access network device, the sending unit 1202 may send a second message to the access network device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before sending the resource request information to the access network device, the sending unit 1202 may send a second message to the access network device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before sending the resource request information to the access network device, the sending unit 1202 may send a second message to the access network device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; and the second frequency indication information is a second frequency index, and the second frequency index is used to indicate a location of the second frequency information in the second frequency information list.

In an implementation, before sending the second message to the access network device, the sending unit 1202 may obtain first RAT indication information of any V2X service.

The communication apparatus may further include a processing unit 1203.

The processing unit 1203 is configured to determine, based on the first RAT indication information, a RAT corresponding to a V2X service identifier used to indicate the V2X service, where the RAT includes the first RAT and/or the second RAT.

The processing unit 1203 is further configured to generate the second message based on the determined RAT.

In an implementation, before sending the second message to the access network device, the sending unit 1202 may obtain a propagation type of any V2X service.

The communication apparatus may further include a processing unit 1203.

The processing unit 1203 is configured to: if the propagation type is multicast or unicast, determine that a RAT corresponding to a V2X service identifier used to indicate the V2X service is the first RAT; or if the propagation type is broadcast, obtain first RAT indication information of the V2X service, and determine, based on the first RAT indication information, a RAT corresponding to a V2X service identifier used to indicate the V2X service, where the RAT includes the first RAT and/or the second RAT.

The processing unit 1203 is further configured to generate the second message based on the determined RAT.

In an implementation, that the sending unit 1202 sends resource request information to the access network device includes: sending a BSR to the access network device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

It should be noted that, for content that is not described in the embodiment corresponding to FIG. 10 and specific implementations of the steps performed by the units, refer to the embodiments shown in FIG. 1 to FIG. 9 and the foregoing content. Details are not described herein.

Figure 11:
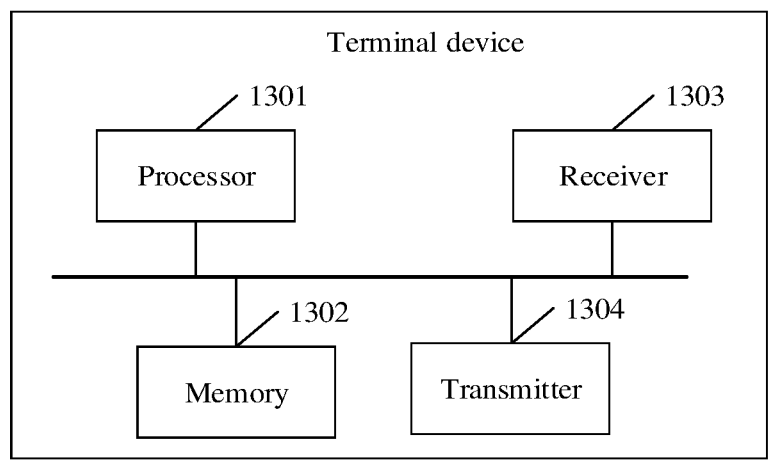
FIG. 11 is a schematic diagram of a structure of a terminal device according to an embodiment of this application.

In an implementation, related functions implemented by the units in FIG. 10 may be implemented in combination with a processor, a transmitter, and a receiver. FIG. 11 is a schematic diagram of a structure of a terminal device according to an embodiment of the present invention. The terminal device includes a processor 1301, a memory 1302, a receiver 1303, and a transmitter 1304. The processor 1301, the memory 1302, the receiver 1303, and the transmitter 1304 are connected through one or more communication buses.

The processor 1301 is configured to support the terminal device in performing the methods in FIG. 2 to FIG. 9 and the steps performed by the first terminal device in the foregoing content. The processor 1301 may be a central processing unit (CPU), a network processor (NP), a hardware chip, or any combination thereof.

The memory 1302 is configured to store program code and the like. The memory 1302 may include a volatile memory, for example, a random access memory (RAM). The memory 1302 may alternatively include a non-volatile memory, for example, a read-only memory (ROM), a flash memory, a hard disk drive (HDD), or a solid-state drive (SSD). The memory 1302 may alternatively include a combination of the foregoing types of memories.

The receiver 1303 is configured to receive a message, for example, receive a first frequency information list and a second frequency information list from an access network device.

The transmitter 1304 is configured to send a message, for example, send resource request information to the access network device.

The processor 1301, the receiver 1303, and the transmitter 1304 may invoke the program code stored in the memory 1302, to perform the following operations: receiving, by the receiver 1303, the first frequency information list and the second frequency information list from the access network device, where the first frequency information list includes at least one piece of first frequency information, and the second frequency information list includes at least one piece of second frequency information; sending, by the transmitter 1304, the resource request information to the access network device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list; receiving, by the receiver 1303, resource indication information from the access network device, where the resource indication information is a time-frequency resource that is determined by the access network device based on the destination V2X service indication information and that is used to indicate a sidelink SL; and sending, by the transmitter 1304, a V2X service to a second terminal device by using the time-frequency resource.

In an implementation, before sending the resource request information to the access network device, the transmitter 1304 may send a second message to the access network device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before sending the resource request information to the access network device, the transmitter 1304 may send a second message to the access network device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before sending the resource request information to the access network device, the transmitter 1304 may send a second message to the access network device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before sending the resource request information to the access network device, the transmitter 1304 may send a second message to the access network device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; and the second frequency indication information is a second frequency index, and the second frequency index is used to indicate a location of the second frequency information in the second frequency information list.

In an implementation, before sending the second message to the access network device, the transmitter 1304 may obtain first RAT indication information of any V2X service.

The processor 1301 is configured to determine, based on the first RAT indication information, a RAT corresponding to a V2X service identifier used to indicate the V2X service, where the RAT includes the first RAT and/or the second RAT.

The processor 1301 generates the second message based on the determined RAT.

In an implementation, before sending the second message to the access network device, the transmitter 1304 may obtain a propagation type of any V2X service.

If the propagation type is multicast or unicast, the processor 1301 determines that a RAT corresponding to a V2X service identifier used to indicate the V2X service is the first RAT; or if the propagation type is broadcast, obtain first RAT indication information of the V2X service, and determine, based on the first RAT indication information, a RAT corresponding to a V2X service identifier used to indicate the V2X service, where the RAT includes the first RAT and/or the second RAT.

The processor 1301 generates the second message based on the determined RAT.

In an implementation, that the transmitter 1304 sends resource request information to the access network device includes: sending a BSR to the access network device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

It should be noted that, for content that is not described in the embodiment corresponding to FIG. 11 and specific implementations of the steps performed by the components, refer to the embodiments shown in FIG. 1 to FIG. 9 and the foregoing content. Details are not described herein.

Figure 12:
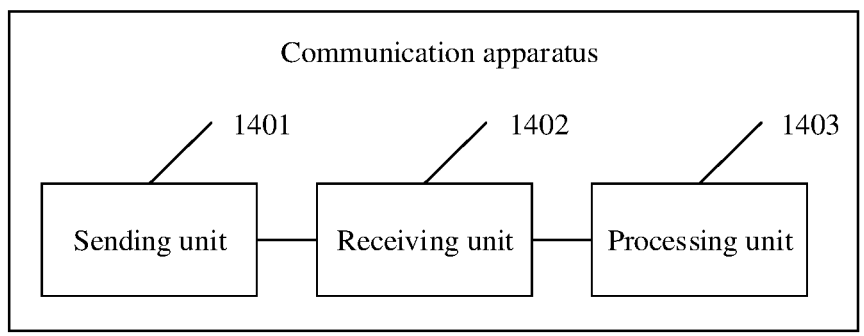
FIG. 12 is another schematic diagram of a structure of a communication apparatus according to an embodiment of this application.

FIG. 12 is another schematic diagram of a structure of a communication apparatus according to an embodiment of this application. The communication apparatus is configured to perform steps performed by the access network device in the method embodiments corresponding to FIG. 2 to FIG. 9 and the foregoing content. The communication apparatus may include: a sending unit 1401, configured to send a first frequency information list and a second frequency information list to a first terminal device, where the first frequency information list includes at least one piece of first frequency information, and the second frequency information list includes at least one piece of second frequency information; a receiving unit 1402, configured to receive resource request information from the first terminal device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list; and a processing unit 1403, configured to generate resource indication information based on the resource request information, where the resource indication information is a time-frequency resource that is determined by an access network device based on the destination V2X service indication information and that is used to indicate a sidelink SL, the time-frequency resource corresponds to a RAT, and the RAT includes the first RAT and/or the second RAT, where the sending unit 1401 is further configured to send the resource indication information to the first terminal device.

In an implementation, before receiving the resource request information from the first terminal device, the receiving unit 1402 may receive a second message from the first terminal device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before receiving the resource request information from the first terminal device, the receiving unit 1402 may receive a second message from the first terminal device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before receiving the resource request information from the first terminal device, the receiving unit 1402 may receive a second message from the first terminal device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before receiving the resource request information from the first terminal device, the receiving unit 1402 may receive a second message from the first terminal device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; the second frequency indication information is a second frequency index, and the second frequency index is used to indicate a location of the second frequency information in the second frequency information list; and the first frequency information list corresponds to the first RAT, and the second frequency information list corresponds to the second RAT.

In an implementation, that the receiving unit 1402 receives resource request information from the first terminal device includes: receiving a BSR from the first terminal device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

In an implementation, that a processing unit 1403 generates resource indication information based on the resource request information includes: determining, based on the destination V2X service indication information, a RAT and frequency information that are used to transmit a V2X service; and generating the resource indication information based on the RAT and the frequency information.

It should be noted that, for content that is not described in the embodiment corresponding to FIG. 12 and specific implementations of the steps performed by the units, refer to the embodiments shown in FIG. 1 to FIG. 9 and the foregoing content. Details are not described herein.

Figure 13:
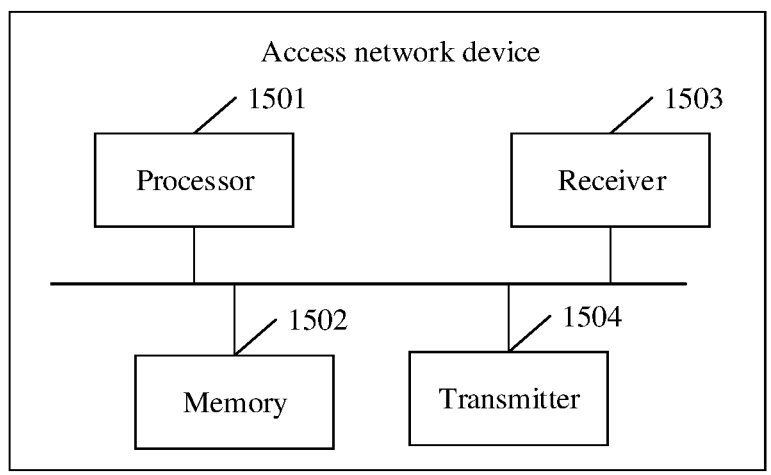
FIG. 13 is a schematic diagram of a structure of an access network device according to an embodiment of this application.

In an implementation, related functions implemented by the units in FIG. 12 may be implemented in combination with a processor, a transmitter, and a receiver. FIG. 13 is a schematic diagram of a structure of an access network device according to an embodiment of the present invention. The access network device includes a processor 1501, a memory 1502, a receiver 1503, and a transmitter 1504. The processor 1501, the memory 1502, the receiver 1503, and the transmitter 1504 are connected through one or more communication buses.

The processor 1501 is configured to support the access network device in performing the methods in FIG. 2 to FIG. 9 and the steps performed by the access network device in the foregoing content. The processor 1501 may be a CPU, an NP, a hardware chip, or any combination thereof.

The memory 1502 is configured to store program code and the like. The memory 1502 may include a volatile memory, for example, a RAM. The memory 1502 may alternatively include a non-volatile memory, for example, a ROM, a flash memory, an HDD, or an SSD. The memory 1502 may alternatively include a combination of the foregoing types of memories.

The receiver 1503 is configured to receive a message, for example, receive resource request information from a first terminal device.

The transmitter 1504 is configured to send a message, for example, send a first frequency information list and a second frequency information list to the first terminal device.

The processor 1501, the receiver 1503, and the transmitter 1504 may invoke the program code stored in the memory 1502, to perform the following operations: sending, by the transmitter 1504, the first frequency information list and the second frequency information list to the first terminal device, where the first frequency information list includes at least one piece of first frequency information, and the second frequency information list includes at least one piece of second frequency information; receiving, by the receiver 1503, the resource request information from the first terminal device, where the resource request information carries destination V2X service indication information, the destination V2X service indication information corresponds to a first RAT and/or corresponds to a second RAT, the first RAT corresponds to the first frequency information list, and the second RAT corresponds to the second frequency information list; generating, by the processor 1501, resource indication information based on the resource request information, where the resource indication information is a time-frequency resource that is determined by the access network device based on the destination V2X service indication information and that is used to indicate a sidelink SL, the time-frequency resource corresponds to a RAT, and the RAT includes the first RAT and/or the second RAT; and sending, by the transmitter 1504, the resource indication information to the first terminal device.

In an implementation, before receiving the resource request information from the first terminal device, the receiver 1503 may receive a second message from the first terminal device, where the second message includes second V2X service information, the second V2X service information includes a first V2X service identifier list, each entry in the first V2X service identifier list includes one V2X service identifier and a first frequency indication information list corresponding to the V2X service identifier, and a destination V2X service identifier indicated by the destination V2X service indication information is one V2X service identifier in the second V2X service information.

In an implementation, the second message alternatively includes third V2X service information, the third V2X service information includes a third frequency indication information list, each entry in the third frequency indication information list includes one piece of second frequency indication information and at least one V2X service identifier corresponding to the second frequency indication information, a destination V2X service identifier indicated by the destination V2X service indication information is one V2X service identifier in second V2X service information or the third V2X service information.

In an implementation, before receiving the resource request information from the first terminal device, the receiver 1503 may receive a second message from the first terminal device, where the second message includes fifth V2X service information, the fifth V2X service information includes a third V2X service identifier list, each entry in the third V2X service identifier list includes one V2X service identifier and a first frequency indication information list or a second frequency indication information list corresponding to the V2X service identifier, and a destination V2X service identifier indicated by the destination V2X service indication information is one V2X service identifier in the fifth V2X service information.

In an implementation, at least two same V2X service identifiers exist in the third V2X service identifier list.

In an implementation, before receiving the resource request information from the first terminal device, the receiver 1503 may receive a second message from the first terminal device, where the second message includes sixth V2X service information and seventh V2X service information, the sixth V2X service information includes a fourth V2X service identifier list, each entry in the fourth V2X service identifier list includes one V2X service identifier and a first frequency indication information list corresponding to the V2X service identifier, the seventh V2X service information includes a fifth V2X service identifier list, each entry in the fifth V2X service identifier list includes one V2X service identifier and a second frequency indication information list corresponding to the V2X service identifier, a destination V2X service identifier indicated by the destination V2X service indication information is one V2X service identifier in the sixth V2X service information or the seventh V2X service information.

In an implementation, before receiving the resource request information from the first terminal device, the receiver 1503 may receive a second message from the first terminal device, where the second message includes ninth V2X service information, the ninth V2X service information includes a sixth V2X service identifier list, each entry in the sixth V2X service identifier list includes one V2X service identifier and a frequency indication information list and second RAT indication information that correspond to the V2X service identifier, the second RAT indication information is used to indicate the first RAT or the second RAT, the frequency indication information list is a first frequency indication information list or a second frequency indication information list, and a destination V2X service identifier indicated by the destination V2X service indication information is one V2X service identifier in the ninth V2X service information.

In an implementation, first frequency indication information is a first frequency index, and the first frequency index is used to indicate a location of the first frequency information in the first frequency information list; the second frequency indication information is a second frequency index, and the second frequency index is used to indicate a location of the second frequency information in the second frequency information list; and the first frequency information list corresponds to the first RAT, and the second frequency information list corresponds to the second RAT.

In an implementation, that the receiver 1503 receives resource request information from the first terminal device includes: receiving a BSR from the first terminal device, where the BSR carries destination RAT indication information, and the destination RAT indication information is used to indicate the first RAT or the second RAT.

In an implementation, the destination V2X service indication information includes the destination V2X service identifier or a destination index, the destination V2X service identifier corresponds to the first frequency indication information list and/or the second frequency indication information list, and the destination index is used to indicate a location of the destination V2X service identifier in first V2X service information.

In an implementation, the first V2X service information is the second V2X service information, fourth V2X service information, the fifth V2X service information, the sixth V2X service information, eighth V2X service information, or the ninth V2X service information, where the fourth V2X service information includes the first V2X service identifier list and a second V2X service identifier list, the second V2X service identifier list includes all the V2X service identifiers in the second V2X service information in sequence, and the first V2X service identifier list is located before or after the second V2X service identifier list; and the eighth V2X service information includes the fourth V2X service identifier list and the fifth V2X service identifier list, and the fourth V2X service identifier list is located before or after the fifth V2X service identifier list.

In an implementation, that a processor 1501 generates resource indication information based on the resource request information includes: determining, based on the destination V2X service indication information, a RAT and frequency information that are used to transmit a V2X service; and generating the resource indication information based on the RAT and the frequency information.

It should be noted that, for content that is not described in the embodiment corresponding to FIG. 13 and specific implementations of the steps performed by the components, refer to the embodiments shown in FIG. 1 to FIG. 9 and the foregoing content. Details are not described herein.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive (SSD)), or the like.

What is claimed is:

1. A method, comprising:
receiving a first frequency information list and a second frequency information list from an access network device, wherein the first frequency information list comprises at least one piece of first frequency information, and the second frequency information list comprises at least one piece of second frequency information;
sending resource request information to the access network device, wherein the resource request information carries destination vehicle-to-everything (V2X) service indication information, the destination V2X service indication information corresponds to a first radio access technology (RAT) or corresponds to a second RAT, the first RAT corresponds to the first frequency information list, and the second RAT corresponds to the second frequency information list;
receiving resource indication information from the access network device, wherein the resource indication information indicates a time-frequency resource that is determined by the access network device based on the destination V2X service indication information and that corresponds to a sidelink (SL) connection;
sending a V2X service to a second terminal device using the time-frequency resource; and
before sending the resource request information to the access network device, sending a second message to the access network device, wherein the second message comprises fifth V2X service information, the fifth V2X service information comprises a third V2X service identifier list, each entry in the third V2X service identifier list comprises one V2X service identifier and a first frequency indication information list corresponding to the one V2X service identifier or a second frequency indication information list corresponding to the one V2X service identifier, and a destination V2X service identifier indicated by the destination V2X service indication information is one V2X service identifier in the fifth V2X service information.

2. The method according to claim 1, further comprising:
sending second V2X service information to the access network device, wherein the second V2X service information comprises a first V2X service identifier list, each entry in the first V2X service identifier list comprises one V2X service identifier and a first frequency indication information list corresponding to the one V2X service identifier, and a destination V2X service identifier indicated by the destination V2X service indication information is one V2X service identifier in the second V2X service information.

3. The method according to claim 1, further comprising:
sending third V2X service information to the access network device, wherein the third V2X service information comprises a third frequency indication information list, each entry in the third frequency indication information list comprises one piece of second frequency indication information and at least one V2X service identifier corresponding to the one piece of second frequency indication information, and a destination V2X service identifier indicated by the destination V2X service indication information is one V2X service identifier in second V2X service information or the third V2X service information.

4. The method according to claim 1, further comprising:
obtaining a propagation type of the V2X service; and
determining, based on the propagation type of the V2X service, a type of the V2X service.

5. The method according to claim 1, wherein the third V2X service identifier list comprises at least two same V2X service identifiers.

6. An apparatus, comprising:
at least one processor; and
a non-transitory memory storing instructions for execution by the at least one processor;
wherein, when executed, the instructions cause the apparatus to perform operations comprising:
receiving a first frequency information list and a second frequency information list from an access network device, wherein the first frequency information list comprises at least one piece of first frequency information, and the second frequency information list comprises at least one piece of second frequency information;

sending resource request information to the access network device, wherein the resource request information carries destination vehicle-to-everything (V2X) service indication information, the destination V2X service indication information corresponds to a first radio access technology (RAT) or corresponds to a second RAT, the first RAT corresponds to the first frequency information list, and the second RAT corresponds to the second frequency information list;

receiving resource indication information from the access network device, wherein the resource indication information indicates a time-frequency resource that is determined by the access network device based on the destination V2X service indication information and that corresponds to a sidelink (SL) connection;

sending a V2X service to a second terminal device using the time-frequency resource; and before sending the resource request information to the access network device, sending a second message to the access network device, wherein the second message comprises fifth V2X service information, the fifth V2X service information comprises a third V2X service identifier list, each entry in the third V2X service identifier list comprises one V2X service identifier and a first frequency indication information list corresponding to the one V2X service identifier or a second frequency indication information list corresponding to the one V2X service identifier, and a destination V2X service identifier indicated by the destination V2X service indication information is one V2X service identifier in the fifth V2X service information.

7. The apparatus according to claim 6, wherein, when executed, the instructions cause the apparatus to perform operations comprising:

sending second V2X service information to the access network device, wherein the second V2X service information comprises a first V2X service identifier list, each entry in the first V2X service identifier list comprises one V2X service identifier and a first frequency indication information list corresponding to the one V2X service identifier, and a destination V2X service identifier indicated by the destination V2X service indication information is one V2X service identifier in the second V2X service information.

8. The apparatus according to claim 6, wherein, when executed, the instructions cause the apparatus to perform operations comprising:

sending third V2X service information to the access network device, wherein the third V2X service information comprises a third frequency indication information list, each entry in the third frequency indication information list comprises one piece of second frequency indication information and at least one V2X service identifier corresponding to the one piece of second frequency indication information, and a destination V2X service identifier indicated by the destination V2X service indication information is one V2X service identifier in second V2X service information or the third V2X service information.

9. The apparatus according to claim 6, wherein, when executed, the instructions cause the apparatus to perform operations comprising:

obtaining a propagation type of the V2X service; and
determining, based on the propagation type of the V2X service, a type of the V2X service.

10. The apparatus according to claim 6, wherein the third V2X service identifier list comprises at least two same V2X service identifiers.

11. A method, comprising:

sending a first frequency information list and a second frequency information list to a first terminal device, wherein the first frequency information list comprises at least one piece of first frequency information, and the second frequency information list comprises at least one piece of second frequency information;

receiving resource request information from the first terminal device, wherein the resource request information carries destination vehicle-to-everything (V2X) service indication information, the destination V2X service indication information corresponds to a first radio access technology (RAT) or corresponds to a second RAT, the first RAT corresponds to the first frequency information list, and the second RAT corresponds to the second frequency information list;

generating resource indication information based on the resource request information, wherein the resource indication information indicates a time-frequency resource that is determined by an access network device based on the destination V2X service indication information and that corresponds to a sidelink (SL) connection, the time-frequency resource further corresponds to a selected RAT, and the selected RAT is the first RAT or the second RAT;

sending the resource indication information to the first terminal device; and before receiving the resource request information from the first terminal device, receiving a second message from the first terminal device, wherein the second message comprises fifth V2X service information, the fifth V2X service information comprises a third V2X service identifier list, each entry in the third V2X service identifier list comprises one V2X service identifier and a first frequency indication information list corresponding to the one V2X service identifier or a second frequency indication information list corresponding to the one V2X service identifier, and a destination V2X service identifier indicated by the destination V2X service indication information is one V2X service identifier in the fifth V2X service information.

12. The method according to claim 11, further comprising:

receiving second V2X service information from the first terminal device, wherein the second V2X service information comprises a first V2X service identifier list, each entry in the first V2X service identifier list comprises one V2X service identifier and a first frequency indication information list corresponding to the one V2X service identifier, and a destination V2X service identifier indicated by the destination V2X service indication information is one V2X service identifier in the second V2X service information.

13. The method according to claim 11, further comprising:

receiving third V2X service information from the first terminal device, wherein the third V2X service information comprises a third frequency indication information list, each entry in the third frequency indication information list comprises one piece of second frequency indication information and at least one V2X service identifier corresponding to the one piece of second frequency indication information, and a destination V2X service identifier indicated by the destination V2X service indication information is one V2X service identifier in second V2X service information or the third V2X service information.

14. The method according to claim 11, further comprising:
obtaining a propagation type of the V2X service; and
determining, based on the propagation type of the V2X service, a type of the V2X service.

15. The method according to claim 11, wherein the third V2X service identifier list comprises at least two same V2X service identifiers.

16. An apparatus, comprising:
at least one processor; and
a non-transitory memory storing instructions for execution by the at least one processor;
wherein, when executed, the instructions cause the apparatus to perform operations comprising:
sending a first frequency information list and a second frequency information list to a first terminal device, wherein the first frequency information list comprises at least one piece of first frequency information, and the second frequency information list comprises at least one piece of second frequency information;
receiving resource request information from the first terminal device, wherein the resource request information carries destination vehicle-to-everything (V2X) service indication information, the destination V2X service indication information corresponds to a first radio access technology (RAT) or corresponds to a second RAT, the first RAT corresponds to the first frequency information list, and the second RAT corresponds to the second frequency information list;
generating resource indication information based on the resource request information, wherein the resource indication information indicates a time-frequency resource that is determined by an access network device based on the destination V2X service indication information and that corresponds to a sidelink (SL) connection, the time-frequency resource further corresponds to a selected RAT, and the selected RAT is the first RAT or the second RAT;
sending the resource indication information to the first terminal device; and
before receiving the resource request information from the first terminal device, receiving a second message from the first terminal device, wherein the second message comprises fifth V2X service information, the fifth V2X service information comprises a third V2X service identifier list, each entry in the third V2X service identifier list comprises one V2X service identifier and a first frequency indication information list corresponding to the one V2X service identifier or a second frequency indication information list corresponding to the one V2X service identifier, and a destination V2X service identifier indicated by the destination V2X service indication information is one V2X service identifier in the fifth V2X service information.

17. The apparatus according to claim 16, wherein, when executed, the instructions cause the apparatus to perform operations comprising:
receiving second V2X service information from the first terminal device, wherein the second V2X service information comprises a first V2X service identifier list, each entry in the first V2X service identifier list comprises one V2X service identifier and a first frequency indication information list corresponding to the one V2X service identifier, and a destination V2X service identifier indicated by the destination V2X service indication information is one V2X service identifier in the second V2X service information.

18. The apparatus according to claim 16, wherein, when executed, the instructions cause the apparatus to perform operations comprising:
receiving third V2X service information from the first terminal device, wherein the third V2X service information comprises a third frequency indication information list, each entry in the third frequency indication information list comprises one piece of second frequency indication information and at least one V2X service identifier corresponding to the one piece of second frequency indication information, and a destination V2X service identifier indicated by the destination V2X service indication information is one V2X service identifier in second V2X service information or the third V2X service information.

19. The apparatus according to claim 16, wherein third V2X service identifier list comprises at least two same V2X service identifiers.

20. The apparatus according to claim 16, wherein, when executed, the instructions cause the apparatus to perform operations comprising:
obtaining a propagation type of the V2X service; and
determining, based on the propagation type of the V2X service, a type of the V2X service.

* * * * *